United States Patent
Durtschi

(10) Patent No.: US 11,649,117 B2
(45) Date of Patent: May 16, 2023

(54) APPARATUS AND METHOD FOR INSPECTING SUSPENDEDLY CONVEYABLE TRANSPORT BAGS

(71) Applicant: FERAG AG, Ch-8340 Hinwil (CH)

(72) Inventor: Andreas Durtschi, Wädenswil (CH)

(73) Assignee: FERAG AG, Hinwil (CH)

(*) Notice: Subject to any disclaimer, the term of this patent is extended or adjusted under 35 U.S.C. 154(b) by 162 days.

(21) Appl. No.: 17/255,263

(22) PCT Filed: Jun. 27, 2019

(86) PCT No.: PCT/IB2019/055424
§ 371 (c)(1),
(2) Date: Dec. 22, 2020

(87) PCT Pub. No.: WO2020/003180
PCT Pub. Date: Jan. 2, 2020

(65) Prior Publication Data
US 2021/0176433 A1   Jun. 10, 2021

(30) Foreign Application Priority Data

Jun. 28, 2018 (CH) .................................. 00819/18

(51) Int. Cl.
*B65G 47/61* (2006.01)
*B65G 17/20* (2006.01)
(Continued)

(52) U.S. Cl.
CPC ............. *H04N 7/18* (2013.01); *B65G 17/485* (2013.01); *B65G 47/38* (2013.01); *B65G 47/61* (2013.01);
(Continued)

(58) Field of Classification Search
CPC .......... H04N 7/18; G06V 20/00; B65D 29/00; B65G 17/20; B65G 43/08; B65G 47/38; B65G 47/61
(Continued)

(56) References Cited

U.S. PATENT DOCUMENTS 3,807,314 A    4/1974  Slemmons
10,322,887 B2 *  6/2019  Fenile .................... B65G 47/36
(Continued)

FOREIGN PATENT DOCUMENTS

DE         103 54 419 A1    6/2005
DE    10 2012 018 925 A1    3/2014
(Continued)

OTHER PUBLICATIONS

EPO (Riswijk, NL), English language version of the International Search Report, Form PCT/ISA/210, for International Application PCT/IB2019/055424, Nov. 6, 2019 (3 pages).

*Primary Examiner* — Douglas A Hess
(74) *Attorney, Agent, or Firm* — Pauley Erickson & Swanson

(57) ABSTRACT

A device for inspecting transport bags (14) that can be conveyed in a suspended manner with a bag interior (16) for receiving piece-goods units (5), the transport bag having a bag opening (17) of the bag interior, includes a device for opening and/or keeping open the bag opening of a transport bag that is to be inspected; and a detection device (70) that is configured to receive at least one two-dimensional and/or three-dimensional image of at least part of the bag interior of the transport bag to be inspected.

31 Claims, 12 Drawing Sheets

(51) Int. Cl.
*B65G 43/08* (2006.01)
*H04N 7/18* (2006.01)
*B65G 17/48* (2006.01)
*B65G 47/38* (2006.01)
*G06V 20/00* (2022.01)

(52) U.S. Cl.
CPC ...... *G06V 20/00* (2022.01); *B65G 2201/0238* (2013.01); *B65G 2203/0283* (2013.01); *B65G 2203/041* (2013.01)

(58) Field of Classification Search
USPC .......................................................... 198/340
See application file for complete search history.

(56) References Cited

U.S. PATENT DOCUMENTS

| | | | | |
|---|---|---|---|---|
| 10,494,196 B2 * | 12/2019 | Fenile | ................... | B65G 47/36 |
| 10,647,523 B2 * | 5/2020 | Sigrist | ................... | B65G 9/002 |
| 10,737,889 B2 * | 8/2020 | Eisenberg | ............... | B65B 43/30 |
| 11,267,658 B2 * | 3/2022 | Fenile | ................... | B65G 47/61 |
| 11,352,216 B2 * | 6/2022 | Reischl | ................ | B65G 19/025 |
| 2014/0193100 A1 | 7/2014 | Sigrist | | |
| 2018/0072511 A1 | 3/2018 | Fenile | | |
| 2018/0354728 A1 | 12/2018 | Sigrist | | |

FOREIGN PATENT DOCUMENTS

| | | | | |
|---|---|---|---|---|
| EP | 0 861 129 A1 | 9/1998 | | |
| EP | 3 293 130 A1 | 3/2018 | | |
| JP | H06-56248 A | 3/1994 | | |
| JP | 2014-76878 A | 5/2014 | | |
| WO | WO 2013/053747 A1 | 4/2013 | | |
| WO | WO 2015/127503 A1 | 9/2015 | | |
| WO | WO 2016/030275 A1 | 3/2016 | | |
| WO | WO 2017/088076 A1 | 6/2017 | | |
| WO | WO2017/109657 A1 | 6/2017 | | |
| WO | WO 2018/078098 A1 | 5/2018 | | |
| WO | WO 2018/142242 A1 | 8/2018 | | |
| WO | WO2018/142243 A1 | 8/2018 | | |
| WO | WO-2020232496 A1 * | 11/2020 | ........... | B65G 1/0457 |

* cited by examiner

APPARATUS AND METHOD FOR INSPECTING SUSPENDEDLY CONVEYABLE TRANSPORT BAGS

BACKGROUND OF THE INVENTION

Field of the Invention

The present invention relates to the field of transport and conveyor technology. It relates to a device and a method for inspecting transport bags that can be conveyed in a suspended manner.

Discussion of Related Art

In automated warehouses, large-scale production facilities, and, more generally, in the conveyance and transport of goods, overhead conveyor systems have proven to be an efficient means for the transporting, intermediate buffering, and long-term storage of various types of goods. In overhead conveyor systems, the goods are either suspended in a suitable manner directly on individual conveyor elements of a conveyor system or introduced into corresponding transport elements such as transport bags, for example, which in turn are supported in a suspended manner on the conveyor elements.

Overhead conveyor systems can be realized as transport chain systems in which a multiplicity of conveying elements form links of a chain that is moved along a conveyance path.

Gravity-assisted conveyor systems are also known in which individual wheeled conveyor elements move on corresponding rails. One example of such a gravity-assisted, rail-guided conveyor system is known from WO 2016/030275 A1 of the applicant.

Overhead conveyor systems with transport elements are particularly suitable for the efficient conveyance of heterogeneous piece goods such as workpieces in production processes, spare parts, and consumer goods such as books, clothes, shoes, etc. For example, in logistics centers of mail-order companies, overhead conveyor systems can be used to store a variety of items of various sizes and weights and to commission groups of items according to the respective customer orders and to provide them for distribution.

A relevant aspect for an overhead conveyor system is the simple, smooth, and efficient introduction of goods into empty transport elements and the simple, smooth, and efficient removal of the goods from the transport elements. While manual removal of the goods from the transport bags allows for flexible handling of various goods, it is slow and costly.

WO 2017/088076 A1 of the applicant discloses a transport unit with a carriage for use in a suspended conveyor system and with a transport bag for receiving the transported goods. As seen in the transport direction, the transport bag has a rear wall and a front wall that is parallel thereto which are pivotably connected via a base and a bow-shaped spacer element. Together with two lateral walls, these form a receiving space in the form of a parallelepiped with an opening. The rear wall of the transport bag is pivotably connected to the carriage. Guide rollers are mounted at a lower end of the rear wall facing away from the carriage and at an upper end of the front wall in order to control the spatial position of the transport bag during conveyance in the transport system by means of slotted guides or other suitable means. In order to automatically empty the transport bag. the transport bag, which is suspended perpendicularly on the carriage during transport, is brought into a horizontal position by means of a suitable slotted guide of the guide wheels on the rear wall, and the conveyance of the bag is interrupted. The bag is then brought into an inclined head-first position by lowering the carriage in which rollers of an inclined roller conveyor engage in corresponding recesses of the front of the transport bag. On the roller conveyor, the transported goods roll out of the transport bag in a gravity-assisted manner and are conveyed away. The carriage is lifted again, and the now-empty transport unit is forwarded for reuse.

The applicant's international application PCT/IB2018/050446 of 25 Jan. 2018 titled "Device for emptying transport bags conveyed in a suspended manner", published as WO 2018/142243 A1, discloses another device for automatically emptying transport bags that are conveyed in a suspended manner. The transport bags have a bag with a front side that is open toward the top in the filled state. The transport bags are conveyed in suspended fashion in a rail-guided conveyor system or a conveyor chain system along a conveyance path and fed to the device. A circulating conveyor belt is used to pick up piece-goods units transported in the transport bags. In a contact section, the conveyance path of the conveyor system and the conveyance path of the conveyor belt are arranged such that the distance between the conveyance path of the conveyor system and the conveyance path of the conveyor belt becomes continuously smaller, so that when a transport bag is conveyed along the contact section, the front side of the bag of the transport bag contacts the conveyor belt and comes to rest on same, the transport bag being swiveled or pivoted backward. In a delivery section, the conveyance path of the conveyor system and the conveyance path of the conveyor belt extend substantially parallel to one another with a certain downward slope, the front of the bag of a transport bag continuing to lie on the conveyor belt during conveyance along the delivery section, so that the opening of the bag of the transport bag is oriented inclined downward and piece-goods units present in the transport bag slide out of the bag and onto the conveyor belt by force of gravity. In a separating section, the distance between the conveyance path of the conveyor system and the conveyance path of the conveyor belt increases continuously, so that when a transport bag is conveyed along the separating section, the emptied transport bag is lifted off the conveyor belt and swivels back into the freely suspended position.

The aforementioned systems are designed such that the emptying of the transport bags occurs automatically by force of gravity. The emptied transport bags are then fed to the transport system for reuse, e.g., refilling. In the event that a transport bag was not emptied as intended during the emptying process, then the transport bag continues to be fed back into the transport system in the still-filled state. The transported goods are not available for further processing as intended. What is more, a transport bag is in circulation in the transport system that should actually be empty. Such undefined conditions must be avoided for various reasons.

The applicant's international application PCT/IB2018/050445 dated 25 Jan. 2018 titled "Device and method for turning, opening, and filling transport bags conveyed in a suspended manner", published as WO 2018/142242 A1, discloses a device for automatically opening empty transport bags that are transported in a suspended manner in a transport system such that they can be efficiently filled efficiently through manual or automatic placement of piece-goods units into the opened transport bag. The filled transport bags are then fed to the transport system for reuse, particularly to intermediate storage or for execution of a commissioning task. If a transport bag were not filled as intended during the filling process, for example because a problem occurs during feeding or during the filling process, this can lead to undefined states and problems in later processing steps.

There is a general need for advancements in this field of technology.

SUMMARY OF THE INVENTION

The terms conveyor unit and transport unit and the terms conveyor system and transport system are used synonymously in the context of this description. The terms trolley and carriage are used synonymously in the context of this description and denote that part of a conveyor unit which can be arranged on a rail of a conveyor system and can be moved in a rolling and/or sliding and/or floating manner on said rail.

It is an object of the invention to provide a device for inspecting transport bags that can be conveyed in a suspended manner that enables the filling status and/or the emptying status of a transport bag to be checked and/or determined in a simple and efficient manner.

It is another object of the invention to provide a method for inspecting transport bags that can be conveyed in a suspended manner that enables the filling status and/or the emptying status of a transport bag to be checked and/or determined in a simple and efficient manner.

These and other objects are achieved by an inventive device and an inventive method according to the independent claim. Other preferred embodiments are indicated in the dependent claims.

In the context of the present disclosure, the term "three-dimensional image" is understood to refer to a dataset that includes the three-dimensional position and, optionally, optical information (brightness, color) of a plurality of points on a surface of an imaged object.

A first aspect of the invention relates to an advantageous device for inspecting transport bags that can be conveyed in a suspended manner.

Such a device for inspecting transport bags that can be conveyed in a suspended manner with a bag interior for receiving piece-goods units; and a detection device that is configured to receive at least one two-dimensional and/or three-dimensional image of at least part of the bag interior of the transport bag to be inspected.

In an advantageous embodiment of such an inspection device, it comprises a device for opening and/or keeping open the bag opening of a transport bag that is to be inspected.

Alternatively or additionally, the transport bag comprises at least one bag opening of the bag interior that lies in an upper region of the bag interior and/or a lateral region of the bag interior when the transport bag is in a suspended position.

The bag opening of the transport bag can be implemented as a transparent region in a wall of the transport bag, particularly as a window or window section in a wall of the transport bag.

Based on the data of the detection device of the inspection device, it is then possible, for example, to determine an emptying status and/or filling status of the inspected transport bag.

If the status of an inspected transport bag does not correspond to the intended value, for example, if the transport bag is not empty after an emptying operation because an object has inadvertently remained in the bag, or if the transport bag is empty after a filling operation, the transport bag in question can be provided with a corresponding virtual marking in a database of the transport system, for example. The transport bag can then be separated or discharged downstream in the transport system for closer inspection without interrupting the continuous operation of the system.

For a commissioning system, however, it is advantageous for not only the incomplete emptying of a transport bag to be reliably detected, but also for the problem to be addressed promptly, since otherwise a commissioning task may not be correctly completed. In such a case, an inspected transport bag can be moved to a position in which it can be safely and efficiently examined by an operator and emptied manually as needed.

Advantageously, the detection device of such an inspection device comprises at least one camera module that is configured to capture or record at least one image of at least part of the bag interior of the transport bag to be inspected.

Such a camera module can be a conventional digital camera, particularly a fast CCD camera module that is suitable for industrial use.

Alternatively or in addition, the detection device can comprise at least one laser scanner module that is configured to guide one or more laser beams over at least part of the surface of the bag interior of the transport bag to be inspected.

The laser scanning module scans the surface to be imaged with a laser beam by line or raster. Sensors detect the signal intensity of the laser light reflected from the surface, and the measured data can be merged into a black and white or grayscale image. The acquired image data are free from distortion due to optical effects. The polar coordinates of a pixel follow from the axis of the laser beam. The distance as a third dimension is determined by pulse transit time or phase shift, for example, depending on the technology used.

Alternatively, the third dimension of a pixel can also be calculated using one or more camera modules that are laterally offset from the laser scanning axis, with camera systems being available that employ different approaches including 3D triangulation, structured-light projection, and elevation profile. The result is a three-dimensional image.

Advantageously, the detection device comprises an illumination module that is configured to illuminate at least part of the bag interior of the transport bag to be inspected with one or more illuminating means.

The illumination means, e.g., focusable spotlights, non-directional lights, LEDs, flashlights, ultraviolet or infrared illuminants, etc., are preferably designed and set up such that the area to be inspected is ideally illuminated and, where applicable, changing intensities of the ambient light do not play a role.

With two or more illumination means that are offset relative to a lens axis of a camera module, a plurality of images can be taken with only a portion of the illumination means being active in each case, e.g., only one illumination means. Owing to the defined, spatially different lighting situation, the image data also contain information on the third dimension. By calculating two or more such image datasets, a three-dimensional image can be obtained. Corresponding algorithms are known to those skilled in the art.

The analogous effect can be achieved by varying the coloration of the illumination means, which shine complementarily red and green, for example, so that the image information for the various illumination means can be separated by applying corresponding color filters to a color image or by using the corresponding color channels of the image sensor or camera module. Accordingly, all illumination means can be active at the same time, and only one image needs to be captured, since the datasets are separated by the light wavelength and not by the time component.

Two or more camera modules with different lens axes can simultaneously capture images with different viewing angles from which three-dimensional images can also be calculated using suitable algorithms. Corresponding camera systems are known and commercially available.

Also known are cameras with only one lens in which the intensity of the illumination is modulated and the transit time of the light, and hence the distance to the sensor, is determined on the basis of the phase shift of the measured signals of a matrix dot.

Advantageously, the detection device further comprises an imaging module that is configured to calculate a three-dimensional image of at least a part of the bag interior of an inspected transport bag from captured or recorded image data of the detection device.

Such an imaging module is advantageous if the imaging devices used do not directly provide a three-dimensional image. The imaging module can be embodied as an electronic device or implemented as an algorithm that is executed on a microprocessor, for example of a digital signal processing unit or of a computer.

In an inspection device according to the invention, the control and evaluation device of the detection device can evaluate the image data to determine whether a transport bag is empty or not. Depending on the position of the inspection device within a conveyor system, appropriate measures can then be taken, in particular the follow-up inspection of a transport bag that is not completely empty after emptying, or the follow-up control of a transport bag that is not filled as intended after filling. This generally allows an improved quality inspection, and in particular the early detection and elimination of unclear or faulty states of an intralogistics system. This can avoid subsequent laborious troubleshooting, for example incorrect deliveries to customers.

Advantageously, the detection device of an inspection device according to the invention comprises an evaluation module that is configured to analyze the captured or calculated image data of an inspected transport bag and to provide data based on this image data analysis that contain information about whether the inspected transport bag is empty or contains an object.

The evaluation module can be embodied as an electronic device or implemented as an algorithm that is executed on a microprocessor, for example of a digital signal processing unit or of a computer.

In the simplest case, the provided data containing information about whether the inspected transport bag is empty or contains an object can comprise a 1/0 signal (empty/not empty). Depending on this value, a process, for example an automatic filling process or an automatic emptying process for transport bags, can be temporarily interrupted in order to evaluate the situation and to remedy the problem that may have arisen. The data can also include a probability value, for example as a percentage. More complex control processes can be implemented in this way.

The evaluation of the image data by an inspection device can also include further aspects in addition to determining the presence of an object in a transport bag. In particular, it is possible to classify or identify the corresponding objects. For example, optically readable information present on a detected object can be identified and evaluated, for example barcodes, 2D matrix codes, numbers, text, etc. This optically readable information can have been attached to the object for this purpose, or it can be already present on the object anyway.

In an advantageous embodiment of a detection device of an inspection device according to the invention, the detection device comprises an evaluation module that is configured to analyze the captured or calculated image data of an inspected transport bag and, based on this image data analysis, to read out optically readable information on an object located in the inspected transport bag.

The specific position and orientation of an object within the transport bag are usually undefined. Advantageously, in a first step the object in the inspection area is identified, in a further step an area containing information is identified in an image area corresponding to the object by using suitable image evaluation algorithms, and finally the information is extracted from this information containing area.

The extraction of information from the image data of an object allows the determination of the identity of the object or the type of object (for example the article number). The corresponding information can then be compared with a desired value of the system so that, for example, transport bags that have been loaded with the wrong object can be identified at an early stage and treated accordingly.

With appropriate algorithms, a more general classification or identification of objects in the transport bags, or an identification or classification without the direct evaluation of optically readable data, respectively, can be carried out.

For example, an evaluation device can be configured to execute in a module algorithms based on the principles of artificial intelligence (AI), in order to identify or classify objects on the basis of captured images. This has the particular advantage that also objects with little or no directly readable optical information, for example smaller packaging with a small font size, or flexible objects such as for example clothes, or goods without packaging such as food (e.g. bread, vegetables, fruits) can be identified or classified.

In an advantageous embodiment of a detection device of an inspection device according to the invention, the detection device comprises an evaluation module that is configured to analyze the captured or calculated image data of an inspected transport bag using AI algorithms and based on this image data analysis, to identify and/or classify an object arranged in the inspected transport bag.

In another advantageous embodiment of an inspection device according to the invention, the device for opening and/or keeping open the bag opening of a transport bag to be inspected comprises a lifting device that is configured to move an inspection bag to be inspected from a conveying position in which the transport bag hangs vertically into an inspection position in which the transport bag is disposed on an inclined plane such that a front wall of the transport bag or an edge of said front wall rests on the inclined plane and the end of the front wall facing toward the bag opening of the transport bag is lower in the direction of gravity than the end of the front wall opposite the bag opening, so that the inner surface of the front wall forms another inclined plane. The detection device is configured to capture or take at least one two-dimensional and/or three-dimensional image of at least part of the bag interior of a transport bag that is disposed in the inspection position, and/or to capture or take at least one two-dimensional and/or three-dimensional digital image of an area of the inclined plane below the opening of the transport bag, and/or to detect the passage of an object sliding on the inclined plane by means of at least one optical sensor, such as a light barrier module, for example.

If an image of the bag interior is captured, then the transport bag can be inspected directly. It can thus be determined whether or not the emptying of the transport bag is complete.

On the other hand, if an image is captured of an area of the inclined plane below the opening of the transport bag, and/or if the passing of an object sliding on the inclined plane is detected with at least one optical sensor, for example a light barrier module, then an indirect inference can be made about the emptying of the transport bag based on the presence or absence of an object on the image and/or the detection or non-detection of an object.

Such an indirect inspection can be performed on its own particularly if the transport bag contains only one piece-goods unit. If a plurality of piece-goods units is being transported in a transport bag, it is more difficult to make a clear characterization through such an indirect inspection of the transport bag.

However, by combining the aforementioned direct inspection with indirect inspection, the overall accuracy of the inspection device can be further improved by further minimizing the number of false positive results (transport bag empty but not classified as empty) and false negative results (transport bag not empty but classified as empty), thereby optimizing the sensitivity and specificity of the inspection device.

A camera module and/or a laser scanner module and/or an illumination module and/or an imaging module and/or an evaluation module can be used for indirect inspection as discussed above for direct inspection.

Advantageously, in such a variant of an inspection device according to the invention, the lifting device comprises a lifting table, a ramp, a circulating conveyor belt, a roller arrangement, or a roller ramp that forms an inclined plane.

Such a lifting device is disclosed, for example, in FIGS. 3, 12, and 13 of the applicant's international application PCT/IB2018/050445, published as WO 2018/142242 A1 (the disclosure of which is hereby incorporated in its entirety into the description by reference), in which lifting devices are used in connection with an automatic filling process in order to open transport bags before filling.

In another advantageous embodiment of an inspection device according to the invention, the device for opening and/or keeping open the bag opening of a transport bag to be inspected comprises a device for emptying transport bags that are conveyed in a suspended manner. The emptying device comprises a conveyor system, particularly a rail-guided conveyor system or a conveyor chain system, with which transport bags can be fed in a suspended manner along a conveyor path, and a circulating conveyor belt for picking up piece-goods units that are transported in the transport bags. In a contact section, the conveyance path of the conveyor system and the conveyance path of the conveyor belt are arranged such that the distance between the conveyance path of the conveyor system and the conveyance path of the conveyor belt becomes continuously smaller, so that when a transport bag is conveyed along the contact section, a front wall of the transport bag contacts the conveyor belt and comes to rest on same, the transport bag being swiveled backward. In a delivery section, the conveyance path of the conveyor system and the conveyance path of the conveyor belt extend substantially parallel to one another with a certain downward slope, and during conveyance of the transport bag along the delivery section, the front wall of the transport bag continues to lie on the conveyor belt, so that the bag opening of the transport bag is oriented inclined downward and piece-goods units that are present in the bag interior of the transport bag slide out of the bag interior and onto the conveyor belt by force of gravity. In a separating section, the distance between the conveyance path of the conveyor system and the conveyance path of the conveyor belt increases continuously, so that when the transport bag is conveyed along the separating section, the emptied transport bag is lifted off the conveyor belt and swivels back into the freely suspended position. The detection device of the inspection device is configured such that it can capture or record the at least one two-dimensional or three-dimensional image of at least part of the bag interior of the transport bag to be inspected when the transport bag to be inspected is located in the delivery section or in the separating section in a defined detection position at which the emptying of the transport bag to be inspected is concluded during functional operation of the device for emptying transport bags that are conveyed in a suspended manner.

An emptying device such as that as used in this inspection device is disclosed, for example, in the applicant's international application PCT/IB2018/050446, published as WO 2018/142243 A1 (the disclosure of which is hereby incorporated into the description in its entirety by reference).

In such an embodiment of an inspection device, a light barrier module of the detection device is advantageously positioned such that it can detect the passage of objects at a certain position of the conveyance path of the conveyor belt.

The passing of an object at the light barrier, particularly a piece-goods unit taken from a transport bag that has just been emptied, can be used to trigger the inspection process of the emptied transport bag. Alternatively or in addition, the corresponding information can also be used to evaluate the results of the inspection process.

The objects can be detected when they slide freely down the conveyor belt, and/or the objects can be detected if they are already resting on a rib or cross member, etc., of the conveyor belt. In the latter case, the speed of the objects is known on the basis of the conveying speed of the conveyor belt. so that information about the size of the object, for example, can also be ascertained.

The detection position of a transport bag can be determined, for example, by a position sensor along the conveyance path of the conveyor belt or of the conveyor system that detects the passage of a transport bag and initiates the inspection process. For example, the position sensor, e.g., a simple induction sensor, can identify the passage of a carriage of a conveyor unit with a transport bag, or the passage of a catch of a conveyor chain that conveys the carriage along the conveyance path of the conveyor system. The transport bag can also be detected directly.

An inspection device according to the invention can have a guide ramp arranged in a separating section that guides transport bags that are lifted off the conveyor belt such that a collision of the transport bags with parts of the detection device, particularly with a camera module of the detection device, is not possible.

In another advantageous design variant of an inspection device, the device for opening and/or keeping open the bag opening of a transport bag to be inspected comprises an actuator device that is configured to move a stable front wall of the transport bag that is movably connected to a stable rear wall of a transport bag to be inspected in relation to said rear wall in the direction of a bag opening of the transport bag, thus moving said rear wall relative to said rear wall in the direction of a bag opening of the transport bag.

Advantageously, in the aforementioned variant of an advantageous inspection device, the actuator device is configured to move a lower edge of the front wall of the transport bag facing away from the bag opening of the transport bag relative to the rear wall of the transport bag in the direction of the bag opening.

Alternatively or in addition, in the aforementioned variant of an advantageous inspection device, the actuator device comprises a lifting table, a ramp, a circulating conveyor belt with ribs, a roller assembly or a roller ramp that move the front wall of the transport bag or the lower edge of the front wall relative to the rear wall of the transport bag in the direction of the bag opening.

In an advantageous variant of such an inspection device according to the invention, the device for opening and/or keeping open the bag opening of a transport bag to be inspected comprises an actuator device that is configured to move a front wall of the transport bag that is movably connected to a rear wall of a transport bag to be inspected relative to said rear wall of the transport bag, or to move a rear wall of the transport bag that movably connected to a front wall of a transport bag to be inspected relative to said front wall of the transport bag.

The actuator device particularly advantageously comprises a sliding block guide that interacts with a bracket of a transport bag to be inspected, which bracket is arranged between the front wall and the rear wall.

A second aspect of the invention relates to an advantageous method for inspecting transport bags that can be conveyed in a suspended manner.

In a method according to the invention for inspecting transport bags that can be conveyed in a suspended manner,
  a transport bag to be inspected is provided, the transport bag having a bag interior for receiving piece-goods units and a bag opening of the bag interior; and
  at least one two-dimensional and/or three-dimensional image is captured or recorded of at least part of the bag interior.

In an advantageous variant of such an inspection method, the bag opening of the transport bag is opened or kept open.

Alternatively or additionally, in such a method the transport bag advantageously has at least one bag opening of the bag interior, which in the hanging position of the transport bag lies in an upper area of the bag interior and/or in a lateral area of the bag interior.

In the method, the bag opening of the transport bag can be implemented as a transparent area in a wall of the transport bag, in particular as a window or window section in a wall of the transport bag.

In such a method, one or more laser beams are advantageously guided over at least part of the surface of the bag interior of the transport bag to be inspected.

In such a method, at least part of the bag interior of the transport bag to be inspected is advantageously illuminated with one or more illumination means.

In such a method, a three-dimensional image of at least part of the bag interior is advantageously calculated from captured or recorded image data of at least part of the bag interior of an inspected transport bag.

In such a method according to the invention, the captured or calculated image data of an inspected transport bag are advantageously analyzed and, based on this image data analysis, data containing information about whether the inspected transport bag is empty or contains an object are provided.

In a method according to the invention, advantageously the captured or calculated image data of an inspected transport bag are analyzed and, based on this image data analysis, optically readable information present on an object arranged in the inspected transport bag is read out.

The information can then be used to identify and/or classify the object.

For further details, reference is made to the above discussion of a corresponding advantageous embodiment of an inspection device.

In a method according to the invention, advantageously the captured or calculated image data of an inspected transport bag are analyzed with AI algorithms, and an object located in the inspected transport bag is identified and/or classified based on this image data analysis.

With regard to further details, reference is again made to the above discussion of a corresponding advantageous embodiment of an inspection device.

Depending on the design of the algorithms, AI modules usually have to be trained first. In an advantageous embodiment of an inspection device according to the invention, instead of a collection of images specially made for this purpose, or in addition to this, images are used for training the AI algorithms that a detection device has captured during running operation.

In an advantageous variant of a method according to the invention, the captured or calculated image data of an inspected transport bag are used to train AI algorithms, with which after completed training further captured or calculated image data of an inspected transport bag can be analyzed and, based on this image data analysis, an object located in the inspected transport bag can be identified and/or classified.

For example, a new article can be inserted into an intralogistics system, and a detection device of an inspection device captures corresponding images of these objects in corresponding transport bags. Advantageously, multiple images of this object type are captured. The corresponding images are then used for training the AI module.

To generate the images, an object can be re-inserted into a transport bag several times and retrieved from it again after the image data have been captured, in order to configure the database for the AI module as diverse and realistic as possible.

Alternatively or additionally, the images can also be generated and collected during normal operation. In this way, the AI module can be continuously trained for new articles.

Said advantageous methods, in which the captured or calculated image data of an inspected transport bag are analyzed and, based on this image data analysis, optically readable information present on an object located in the inspected transport bag is read out, in order to identify and/or classify the object; and/or the captured or calculated image data of an inspected transport bag are analyzed with AI algorithms and an object located in the inspected transport bag is identified and/or classified based on this image data analysis, can alternatively or additionally also be used to identify and/or classify objects after they have been retrieved from a transport bag or before they are inserted into a transport bag.

The objects can be on a conveyor means, for example a belt conveyor or a roller conveyor. It is also possible that the objects are in free fall or in free flight, for example during a removal or filling process. Depending on the speed of the object, the shutter speed must be correspondingly short when capturing images.

If the object is in midair when taking the image, several camera modules can be used to image the object as completely as possible, or to obtain as much image information as possible.

When using two or more cameras, it is also possible to calculate a three-dimensional image of the object with the aid of appropriate image processing algorithms.

In an advantageous variant of a method according to the invention,
- an image is captured that shows at least one inner side of a wall, particularly a front wall of a transport bag to be inspected lying against the bag interior;
- an inspection area is identified on the captured image showing at least a part of the inside of the wall;
- the image data of the identified inspection area are then analyzed as to whether, in addition to the inside of the wall, another object is also imaged; and
- on the basis of this image data analysis, data are provided which contain information about whether the inspected transport bag is empty or contains an object.

In such a variant of a method for identifying the inspection area in the image, the image coordinates of the two outer endpoints of the upper edge of the front wall of the transport bag facing toward the bag opening and the image coordinates of the two endpoints of the lower edge of the front wall facing away from the bag opening are advantageously determined; and at least a portion of a quadrangle that is defined by the image coordinates of the four mentioned endpoints is defined as the inspection area.

Alternatively or in addition, in such a variant of a method, the inside of the front wall of the transport bag is monochrome; the brightness of the pixels within the inspection area is compared to a threshold value; and, on the basis of the number of pixels below and above the threshold or limit value, data are provided which contain information about whether or not an object is imaged within the inspection area.

Especially advantageous, in the aforementioned variant of the method, coherent groups of pixels below and/or above said threshold value that fall short of and/or exceed a certain quantity are given special consideration in the provision of the data. Minor aberrations caused by dirt on a camera lens or due to noise, for example, can thus be ignored. Even minor soiling, for example on the inside of the interior volume of the bag, can be eliminated.

In methods according to the invention, one or more digital filters—e.g., a contrast filter, a tonal value correction, or a gradation curve, are advantageously applied to image data and/or to captured or recorded images.

In another advantageous variant of a method according to the invention for inspecting transport bags that can be conveyed in a suspended manner,
- a transport bag to be inspected is provided which has a front wall and, when the transport bag is in the suspended position and in the filled state, an upwardly open bag interior;
- the transport bag is brought from a first, vertically suspended position into a second position in which the transport bag is arranged on an inclined plane such that the front wall or an edge of the front wall rests on the inclined plane, and the end of the front wall facing toward the opening of the transport bag is lower in the direction of gravity than the end of the front wall opposite the opening, so that the inner surface of the front wall forms another inclined plane; and
- at least one two-dimensional and/or three-dimensional image is captured of at least part of the bag interior; and/or at least one two-dimensional and/or three-dimensional image is captured of a region of the inclined plane below the opening of the transport bag; and/or the passing of an object sliding on the inclined plane is detected with at least one optical sensor, for example a light barrier module.

As will readily be understood, the above statements concerning the direct and indirect inspection of a transport bag in connection with an inspection device according to the invention also apply to the method.

Advantageously, in the aforementioned variant of a method according to the invention, an image is captured or recorded that shows a region of the inclined plane below the opening of the transport bag; and the image data are then analyzed as to whether only the inclined plane is shown in the image, or also another object, particularly a piece-goods unit that has slipped or is slipping out of the transport bag; and/or the passing of objects sliding on the inclined plane is detected with at least one optical sensor.

It is especially advantageous if the number of objects on the inclined plane and/or the surface extension of the objects is determined.

In all of the abovementioned variants of methods according to the invention, information about the objects located in the transport bag to be inspected, particularly the size and/or number of the objects, is advantageously taken into account in the evaluation.

BRIEF DESCRIPTION OF SEVERAL VIEWS OF THE DRAWINGS

To facilitate better understanding of the present invention, reference is made below to the drawings. These show only exemplary embodiments of the subject matter of the invention.

In the figures and the associated description, identical or functionally analogous parts are provided with the same reference numerals.

DETAILED DESCRIPTION OF THE INVENTION

Figure 1A:
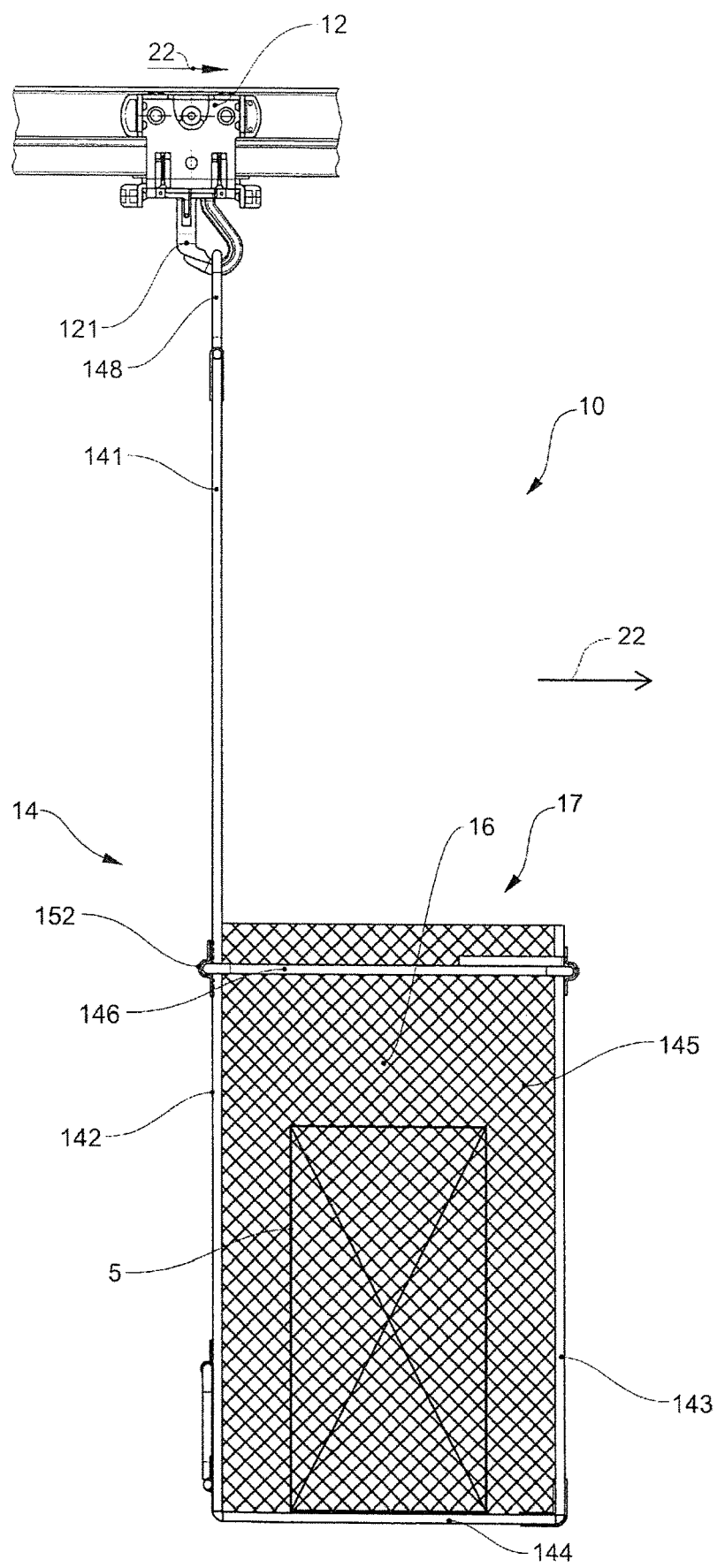
FIG. 1a shows a schematic representation of a conveyor unit of a conveyor system, with a transport bag transverse to the direction of conveyance, filled with a piece-goods unit, in a side view of the transport bag with direction of conveyance to the right.
Figure 1B:
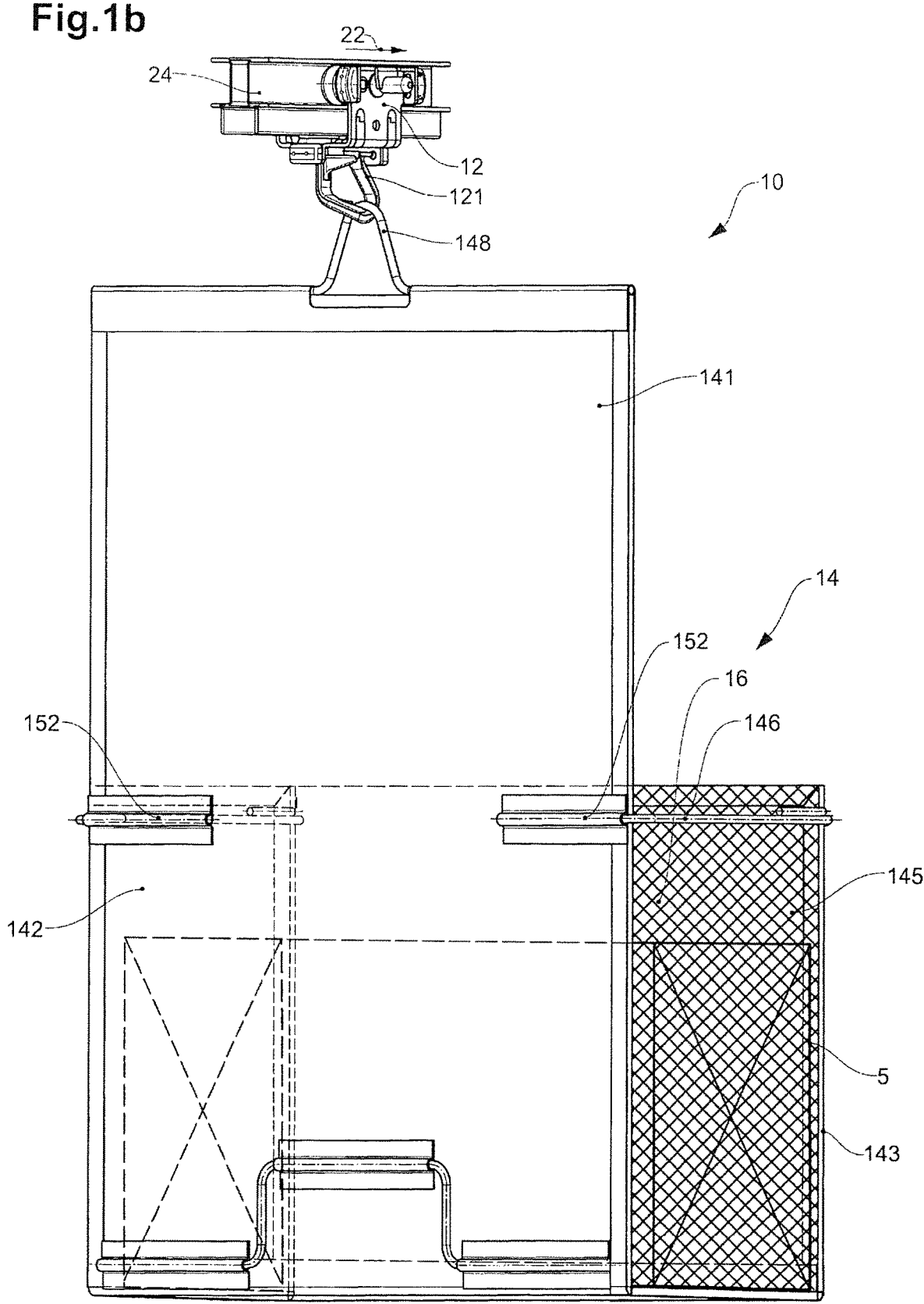
FIG. 1b shows a schematic representation of a conveyor unit of a conveyor system, with a transport bag transverse to the direction of conveyance, filled with a piece-goods unit, in an angular view from behind of the transport bag.
Figure 1C:
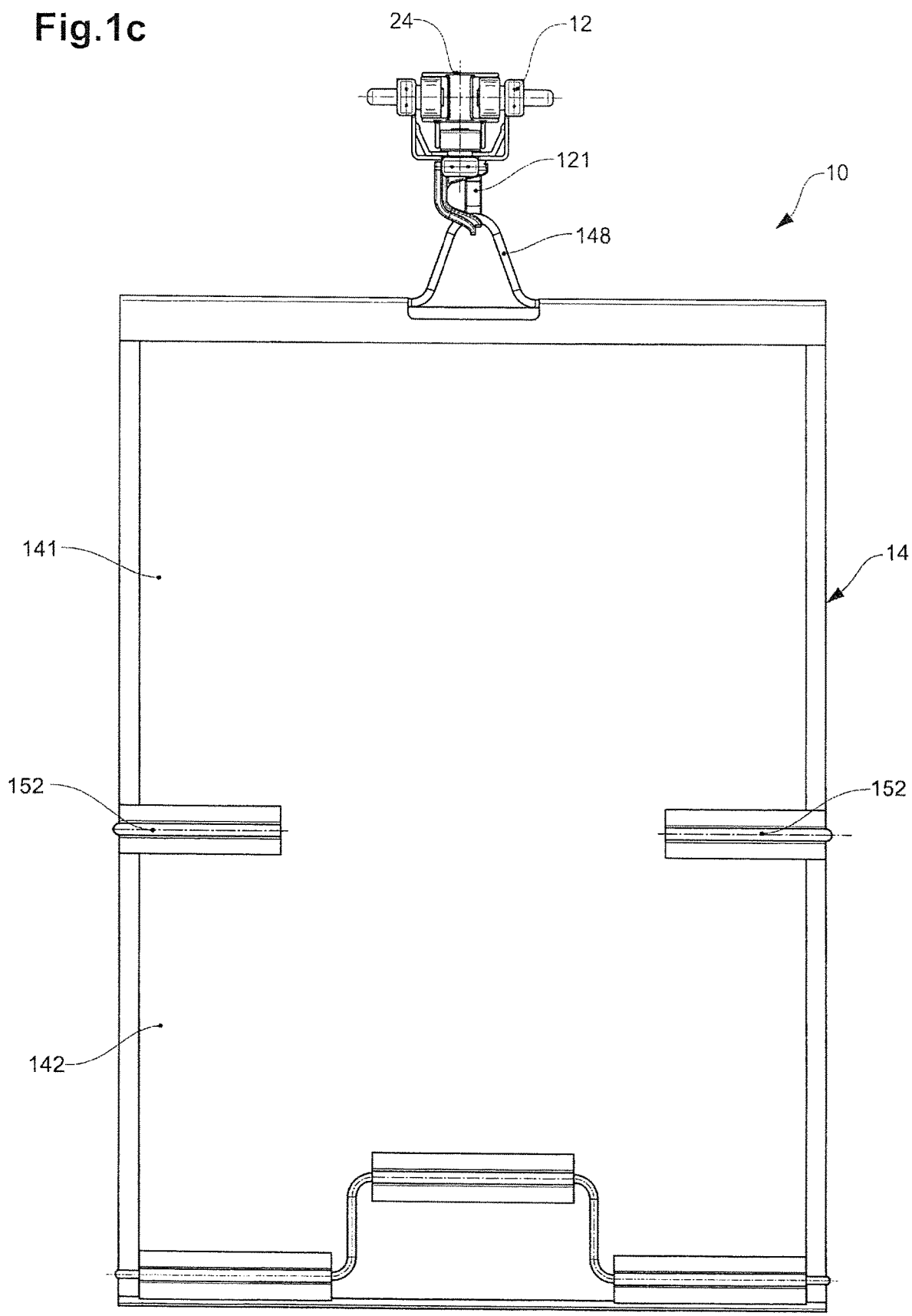
FIG. 1c shows a schematic representation of a conveyor unit of a conveyor system, with a transport bag transverses to the direction of conveyance, filled with a piece-goods unit, in a rear view of the transport bag viewed in the direction of conveyance.

Applicant's previously mentioned international applications PCT/IB2018/050445 and PCT/IB2018/050446 (published as WO 2018/142242 A1 and WO 2018/142243 A1) describe advantageous apparatus for automatically filling or emptying transport bags of conveyor units of a conveyor system that are conveyed in a suspended manner. A conveyor unit 10 such as can be used in such advantageous devices is shown in FIG. 1. A transport bag 14 has a suspension hook 148 that is hooked into a support hook 121 of a trolley or carriage 12. In the exemplary embodiments that are set out in this description, the trolley or carriage is a carriage 12 of a gravity-assisted overhead conveyor 20 analogous to an overhead conveyor system as disclosed in WO 2016/030275 A1 of the applicant, for example. In the interest of greater clarity, the carriage 12 is shown on a running rail 24 of a conveyor system 20, where it moves in a designated direction of conveyance 22.

The transport bag 14 comprises a front wall 143, a bottom portion 144, and a rear wall 142 that are pivotably connected to the colliding edges. Front wall, rear wall, and bottom portion have a stable design and can be made of a suitable plastic material, for example—e.g., of a hollow profile plate. Flexibly configured lateral walls 145, 145' connect front wall, rear wall, and bottom portion, so that an interior volume 16 of the bag results in an opening 17 into which at least one piece-goods unit 5 can be loaded. In the example shown, the lateral walls are made of a fine-mesh net. It is also possible to use a flexible textile material or a flexible foil, particularly a transparent foil. The lateral walls 145, 145' are configured so as to also fold together when the transport bag is folded together as described below.

A pivotably mounted spacer 146, 146' in the form of a wire bracket is arranged on each side between front wall 143 and rear wall 142. The spacers are arranged so as to be substantially parallel to the bottom portion 144 and have the same length as the bottom portion, and the front wall 143 is substantially parallel to the rear wall 142, so that rear wall 142, spacers 146, 146', front wall 143, and bottom portion 144 form a parallelogram accordingly.

In the shown example shown, one end of the wire bracket 146, 146' is movably attached to the rear wall 142, namely rotatably moveable, so that a hinge 152 is formed. The other end of the wire bracket 146, 146' is attached to the front wall 143 in a similar manner.

When unloaded, the weight of the front wall and the bottom portion lower the front wall, so that the transport bag changes to a second state in which the front wall and the rear wall are close to one another. In this configuration, the transport bag can be stored in a space-saving manner in a conveyor system by virtue of the fact that the conveyor units are lined up on a running rail so as to be flush with each other.

By lifting the front wall 143 and/or the bottom portion 144 opposite the rear wall 142, the transport bag can be moved from the second, folded state to a first, deployed state, as shown in FIG. 1. The upwardly oriented opening 17 of the transport bag 14 is now in a ready-to-fill state.

In the exemplary embodiment that is shown, a piece-goods unit 5 is disposed in the transport bag 14 and represented schematically by a cuboid object.

The rear wall 142 is extended at its upper end into a support section 141, at the upper end of which the suspension hook 148 in the form of a wire bracket is pivotably connected to the rear wall 142 or the support section 141 thereof.

The support hook 121 is attached to a lower end of the carriage 12 facing away from the running rail 24. It can be made of metal or of a suitable polymer material, for example a glass fiber-reinforced thermoplastic material. As shown in FIG. 1, the suspension hook 148 is in a stable position in which the suspension hook 148 is oriented on a plane transverse to the direction of conveyance 22. The front side 143 of the transport bag 14 faces in the direction of conveyance 22.

Figure 2:
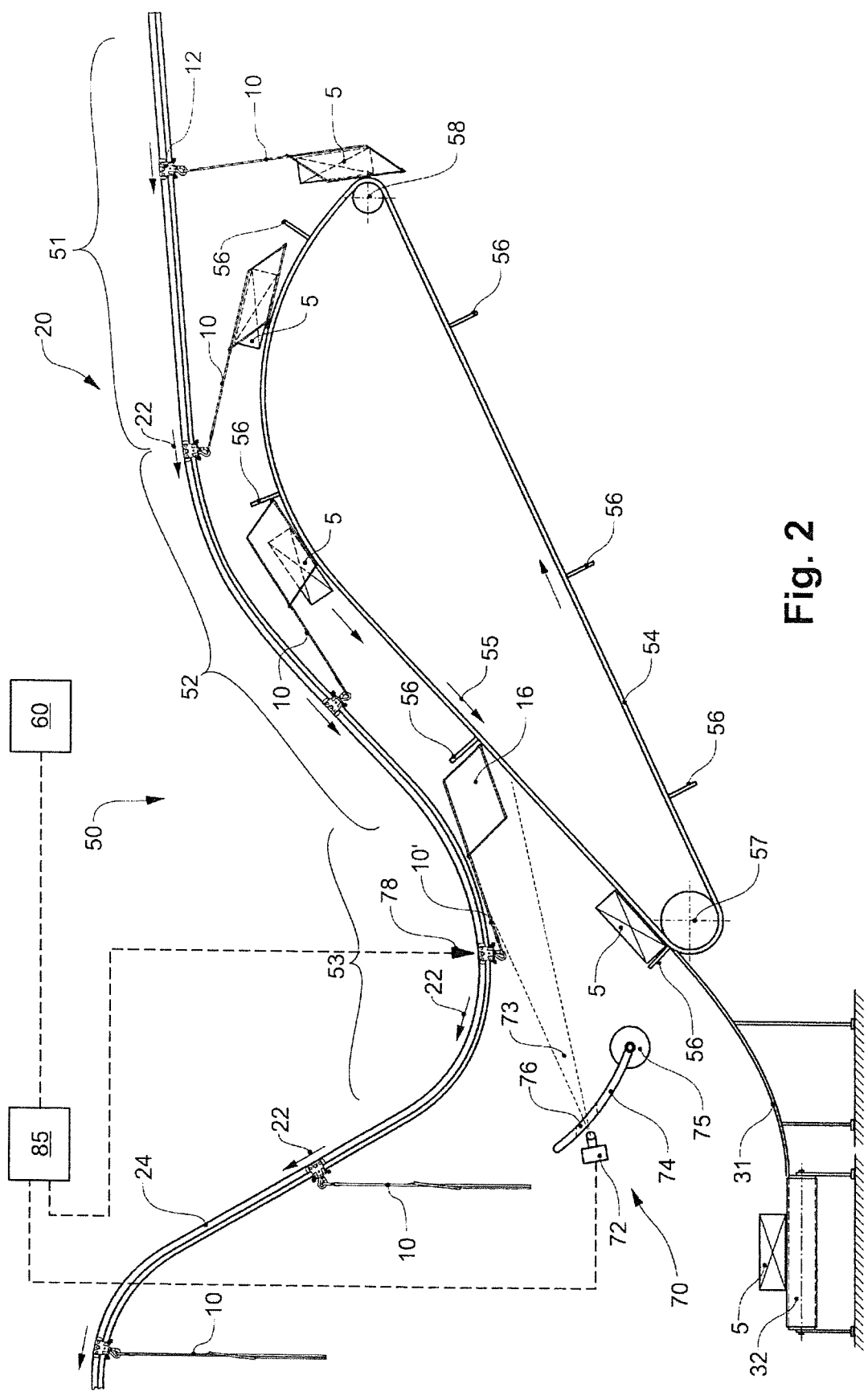
FIG. 2 shows a schematic representation of a device for emptying transport bags that are conveyed in a suspended manner.

An advantageous device 50 for emptying transport bags 14 that are conveyed in a suspended manner is shown in FIG. 2 in a snapshot of a continuous overall process. The corresponding process with the various operating sequences in the operation of the device is described in detail in the applicant's international application PCT/IB2018/050446 (published as WO 2018/142243 A1). The device 50 allows for the automated emptying of transport bags 14 in continuous operation, as well as for the timed transfer of the removed piece goods 5 for further processing.

The emptying device 50 is part of a conveyor system 20 for conveying transport bags 14 in a suspended manner. Such a conveyor system can be embodied as a transport chain conveyor or as a gravity-assisted overhead conveyor system. Functionally, this is not relevant to the device 50, since the individual conveyor units 10 are forcibly conveyed with the transport bags 14 in the vicinity of the emptying device 50 at a specific, constant speed in any case. In the case of a gravity-assisted overhead conveyor system, this is achieved by means of a conveyor chain system (not shown) that extends parallel to the running rail 24 and entrains the individual carriages 12 with the transport bags 14 along the conveyance path of the conveyor system 20.

The conveyance path of the conveyor system 20 runs in the direction of conveyance 22 from right to left. A conveyor belt 54 that circulates in the counterclockwise direction beneath the conveyor system 20 whose tangential conveying speed is equal to the conveying speed of the conveyor system. Transverse ribs 56 are arranged on the conveyor belt 54 at regular intervals along the periphery.

In a first step, a conveyed, filled transport bag 14 is placed on the conveyor belt 54 and moved into a state in which the goods can be removed from the bag. In the process, the front wall of the transport bag is pulled down by the weight of the front wall, the bottom portion, and the piece goods, so that the distance between the rear wall and the front wall is minimal in the context specified by the piece goods.

The front wall 143 of the transport bag 14 finally hits the circulating conveyor belt 54 and is pivoted rearward with respect to the direction of conveyance 22. This marks the beginning of a contact section 51 of the device 50. The conveyor belt 54 has a flattening slope in this section, whereas the running rail 24 of the conveyor system 20 has a constant slope to the left. The result for the conveyor belt is a lower horizontal speed component than for the conveyor system. Finally, toward the end of the contact section 51, the conveyance path of the conveyor belt 54 and the conveyance path of the conveyor system 20 are substantially parallel, and the horizontal velocity components have adapted to one another.

It should be noted that the absolute speeds of conveyor belt and conveyor system are the same and do not change. Only the horizontal velocity components differ at the various positions along the conveyance path.

The distances between the transverse ribs 56 correspond substantially to the distances of the trolleys or carriages 12 of the conveyor units 10 on the conveyor system 20. The relative phase shift of the ribs 56 relative to the carriages 12 is selected such that a rib 56 travels behind a transport bag 14 in the contact section, slowly catching up with the transport bag 14 until the rib finally reaches the bottom portion 144 and the lower edge of the front wall 143 of the transport bag 14. In this area, the rib moves horizontally faster than the transport bag, whose carriage has already reached an area of increasing gradient. The rib 56 now pushes the bottom portion 144 of the bag 14 forward, so that the distance between front wall 143 and rear wall 142 increases. Finally, at the end of the contact section 51, the transport bag 14 assumes a state in which the transport bag 14 is maximally opened and can be emptied. This marks the end of the contact section 51 and the beginning of the delivery section 52 of the device 50.

In the delivery section 52, the conveyance paths of the conveyor system 20 and of the conveyor belt 54 run parallel to one another with a certain gradient. Conveyor system 20 and conveyor belt 54 have an identical horizontal and vertical velocity component. A piece-goods unit 5 that is present in the transport bag 14 slides down the conveyor belt 54 out of the transport bag 14 until the piece-goods unit 5 finally reaches the transverse rib 56 running in front of it and is stopped by same.

Meanwhile, the emptied transport bag 14 is again slowly lifted off the conveyor belt 54, since the conveyance path of the conveyor system 20 pivots upward away from the conveyance path of the conveyor belt 54. This marks the end of the delivery section 52 and the beginning of the separating section 53 of the device 50. Ultimately, the empty transport bag 14 lifts off the conveyor belt 54. The empty transport bag 14 now swivels back into the freely suspended position and is guided away to the top left for reuse in the conveyor system 80.

Meanwhile, the transverse rib—together with the piece good unit 5 lying thereon—reaches the end of the conveyor belt 54.

Advantageously, the transverse ribs 56 consist of a plurality of outwardly projecting fingers (not visible in FIG. 2) that pass through corresponding slots (not visible) in a chute 31 directly adjoining the conveyor belt 54. The piece-goods units 14 are thus delivered to the chute 31 in a timed manner as soon as the fingers of the ribs 56 have swiveled through the slots of the chute 31 upon reaching the guide roller 57 and no longer hold back the piece goods. The piece-goods unit 5 slides by force of gravity down the chute 31 and finally lands on another conveyor; in the depicted example, this is a conveyor belt 32 that guides the piece goods transverse to the chute for further use.

The device shown has the particular advantage that the automatic emptying of the transport bags takes place continuously. Another advantage is the ability to further process the removed piece-goods units in a timed manner.

A position sensor 78 is disposed at a suitable location along the conveyance path of the transport system 20. The position sensor can comprise an induction sensor element, for example, with which the passing of a metal position mark of a catch of the conveyor chain drive that entrains the carriage 12 of the conveyor unit 10 can be identified. Also possible is an optical sensor such as for example a light barrier.

When a delivery unit 10' reaches the position sensor 78 after the emptying of the transport bag 14 that is to now be inspected, the position sensor 78 reports this to a control and evaluation device 85 of the detection device. The transport bag to be inspected has reached the detection position. The control and evaluation device 85 of the detection device 70 now causes a suitably arranged camera module 72 of the detection device to capture an image of the bag interior 16 through the bag opening 17. The continuous conveyance of the transport bag is not interrupted for this purpose. The camera module must be appropriately photosensitive in order to allow for a suitably short shutter speed. Alternatively, the camera module can also obtain images in a continuous way. Two illuminating elements (not shown) illuminate the corresponding area.

The captured image is transmitted to the control and evaluation device 85 of the detection device. The corresponding evaluation is described in more detail in FIGS. 5 to 7.

If the control and evaluation device 85 concludes that the inspected transport bag is empty, the continuous conveying process is continued uninterrupted. The transport bag is lifted off the conveyor belt 54. In order to prevent the now freely suspended transport bag from hitting the camera module 72, a guide ramp 74 carries the transport bag over the camera module. To ensure that the camera module still has a clear view of the detection position nonetheless, a viewing port 76 is provided in the ramp. In order to protect the transport bags mechanically when in contact with the guide ramp 74, a shock-absorbing roller 75 is provided which dampens the impact of the forward-swinging transport bag and then guides the transport bag onto the guide ramp 74. The shock-absorbing roller 75 can be embodied as a brush roller or foam roller, for example, that is fixedly attached, freely rotating, or driven.

On the other hand, if the control and evaluation device 85 concludes that the inspected transport bag is not empty, then the control and evaluation device 85 causes a control unit 60 of the emptying device 50 to interrupt the delivery within the emptying device 50. An operator can now inspect the transport bag in a position slightly below the detection position and remove any remaining contents manually and place them onto the chute 31 as warranted. One conceivable scenario is a light piece-goods unit that becomes stuck to the inside of the bag due to an adhesive residue, for example.

Figure 3:
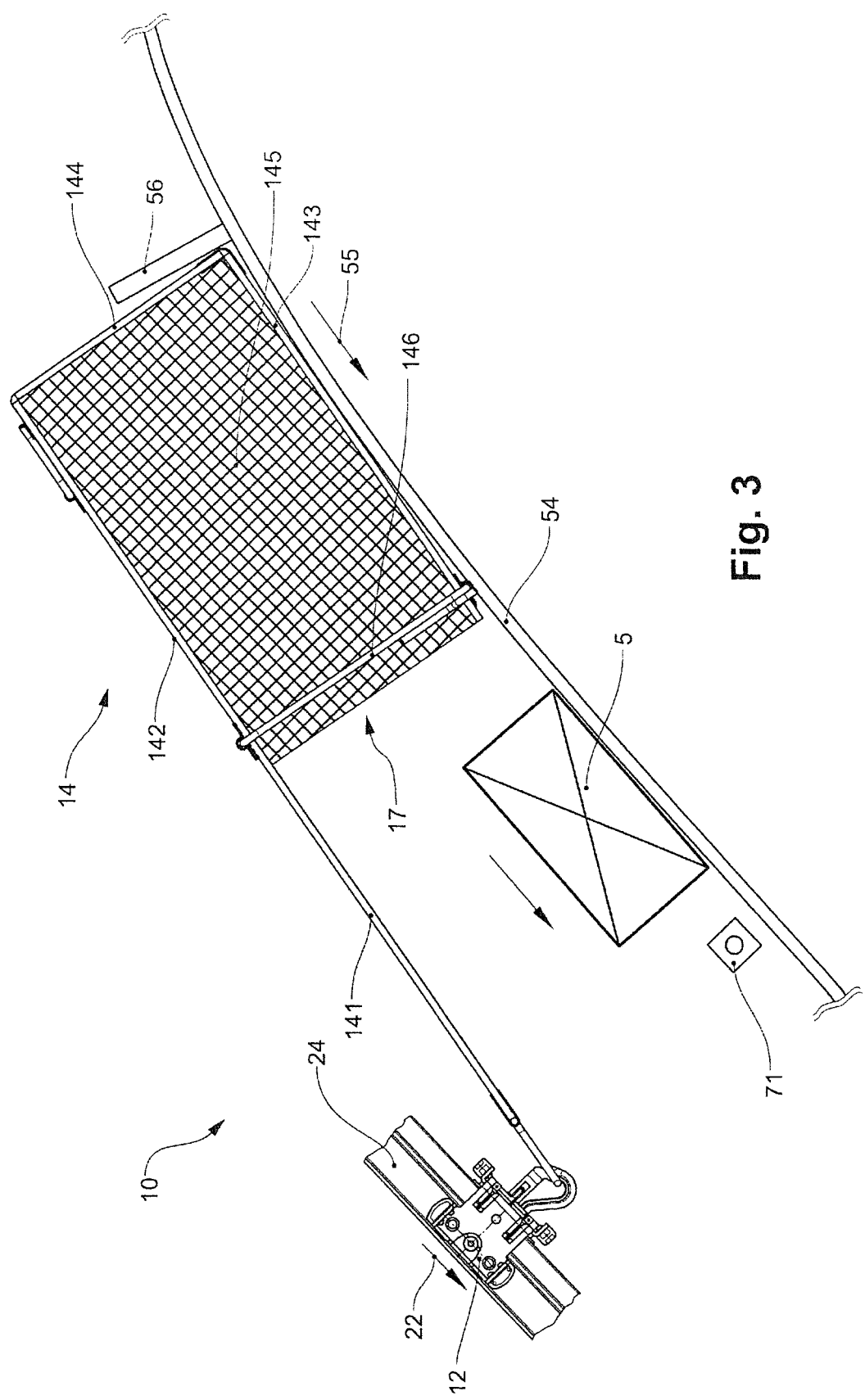
FIG. 3 shows schematic detail of a snapshot of the emptying process of a transport bag in a device like in FIG. 2.
Figure 4:
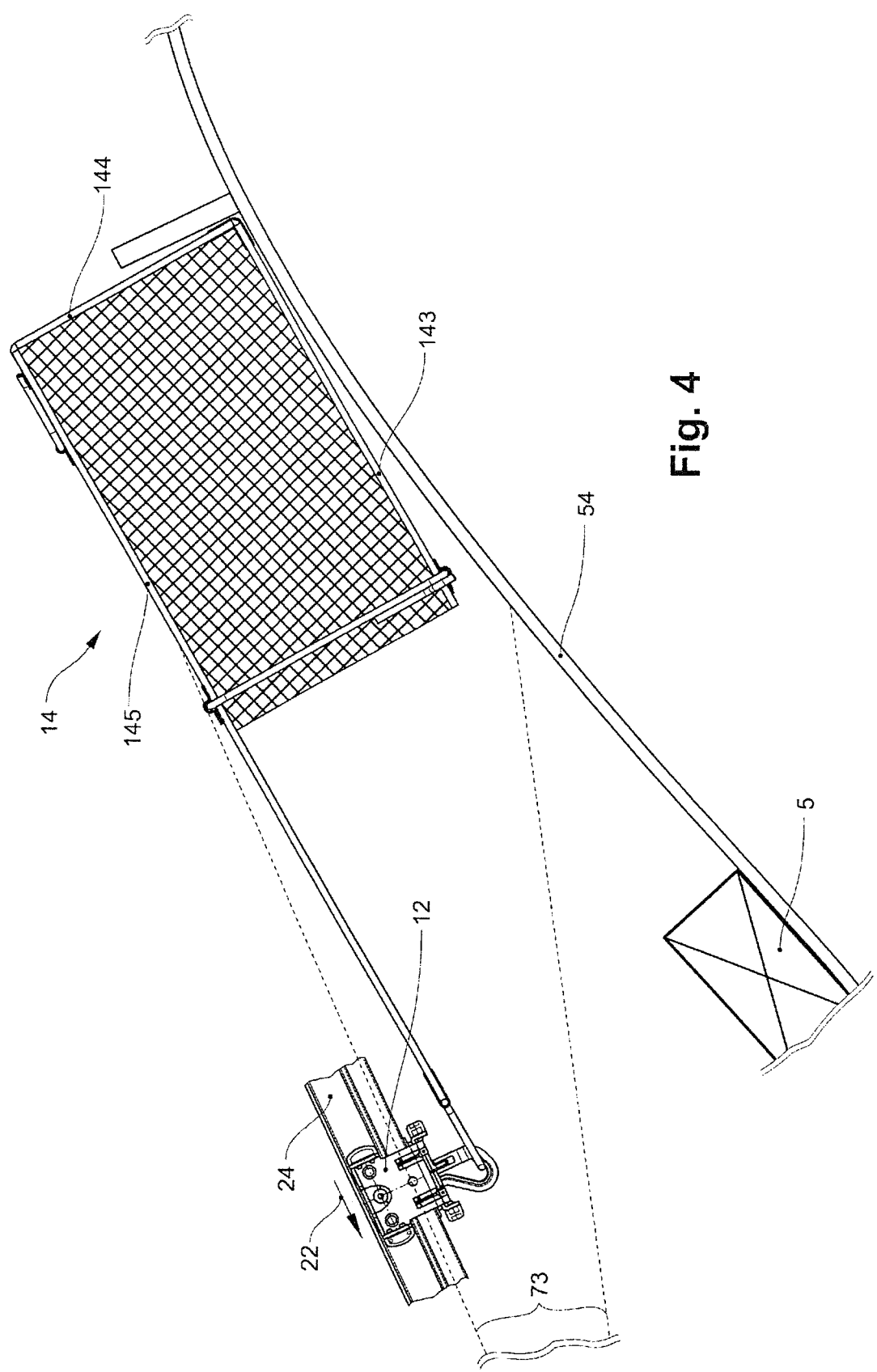
FIG. 4 shows a schematic representation of the automatic inspection of a transport bag after emptying.

An inspection process according to the invention is also illustrated in FIGS. 3 and 4.

In FIG. 3, the transport bag 14 is completely opened, since the transverse rib 56 of the conveyor belt 54 has pushed the front wall 143 forward in the direction of conveyance relative to the rear wall 142, which is pulled by the entrained carriage 12. A piece-goods unit 5 that was previously in the transport bag slips on the inside of the front wall 143 and then down the inclined plane of the conveyor belt 54 until it is stopped by the leading rib (not visible) of the conveyor belt. A light barrier 71 that is arranged transverse to the fall line detects the piece-goods unit 5 that is sliding by, which already indirectly provides information for the emptying process. The running rail 24 and the conveyor belt 54 are substantially parallel.

FIG. 4 shows a situation further downstream in the direction of conveyance. The negative slope of the running rail 24 decreases, so that the transport bag begins to lift off the conveyor belt 54. Only the lower edge of the front wall 143 of the transport bag 14 is still lying on the conveyor belt. However, the transport bag is still fully open. This position of the transport bag represents the detection position. A camera module (not visible) is arranged and configured such that the inside of the front wall 143 lies in its field of view 73, so that it can be fully imaged.

Figure 5:
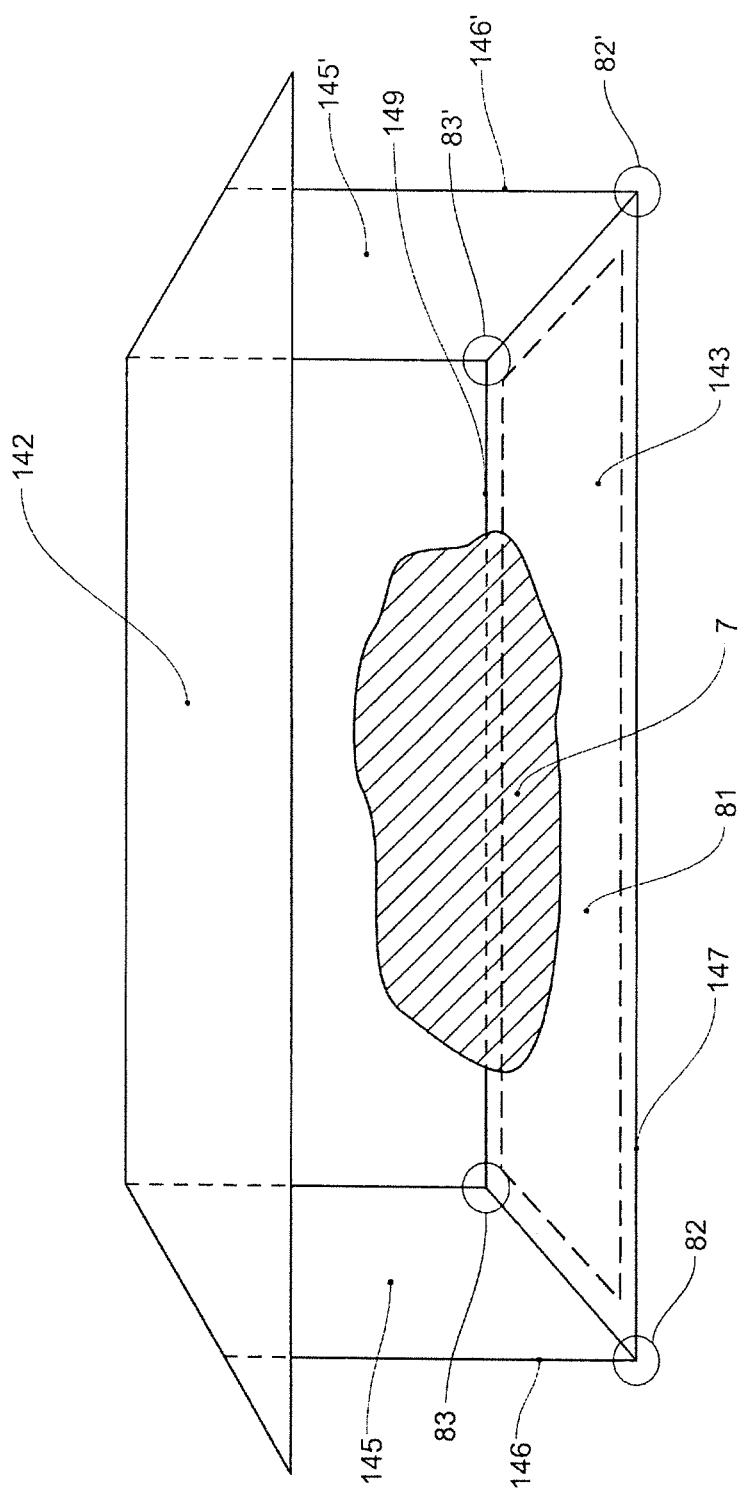
FIG. 5 shows a schematic representation of the image evaluation of an automatic inspection of a transport bag.

The field of view 73 of the camera module is shown schematically in FIG. 5. The entire inner surface of the front wall 143 of the transport bag is visible. The insides of the lateral walls 145, 145' and of the bottom portion are only partially visible. The rear wall 142 can be seen from the outside.

With a suitable image recognition algorithm, a control and evaluation device of the detection unit can now identify the outer ends 82, 82' of the upper edge 147 of the front wall in a corresponding image of a transport bag captured or filmed by the camera module. The outer ends 83, 83' of the lower edge 149 of the front wall are also identified. An inspection area 81 (dashed quadrangle) is defined from the region of the image within the quadrangle formed by these four points. The image region of this inspection area can now be evaluated for the inspection in order to identify the presence of an undefined object 7, for example, as is shown in FIG. 5.

The establishment of the inspection area 81 on the basis of orientation points on the transport bag offers the advantage that possible differences in the position of the transport bag at the detection position can be easily compensated for, which improves the reproducibility of the evaluation process and reduces error rates.

Figure 6:
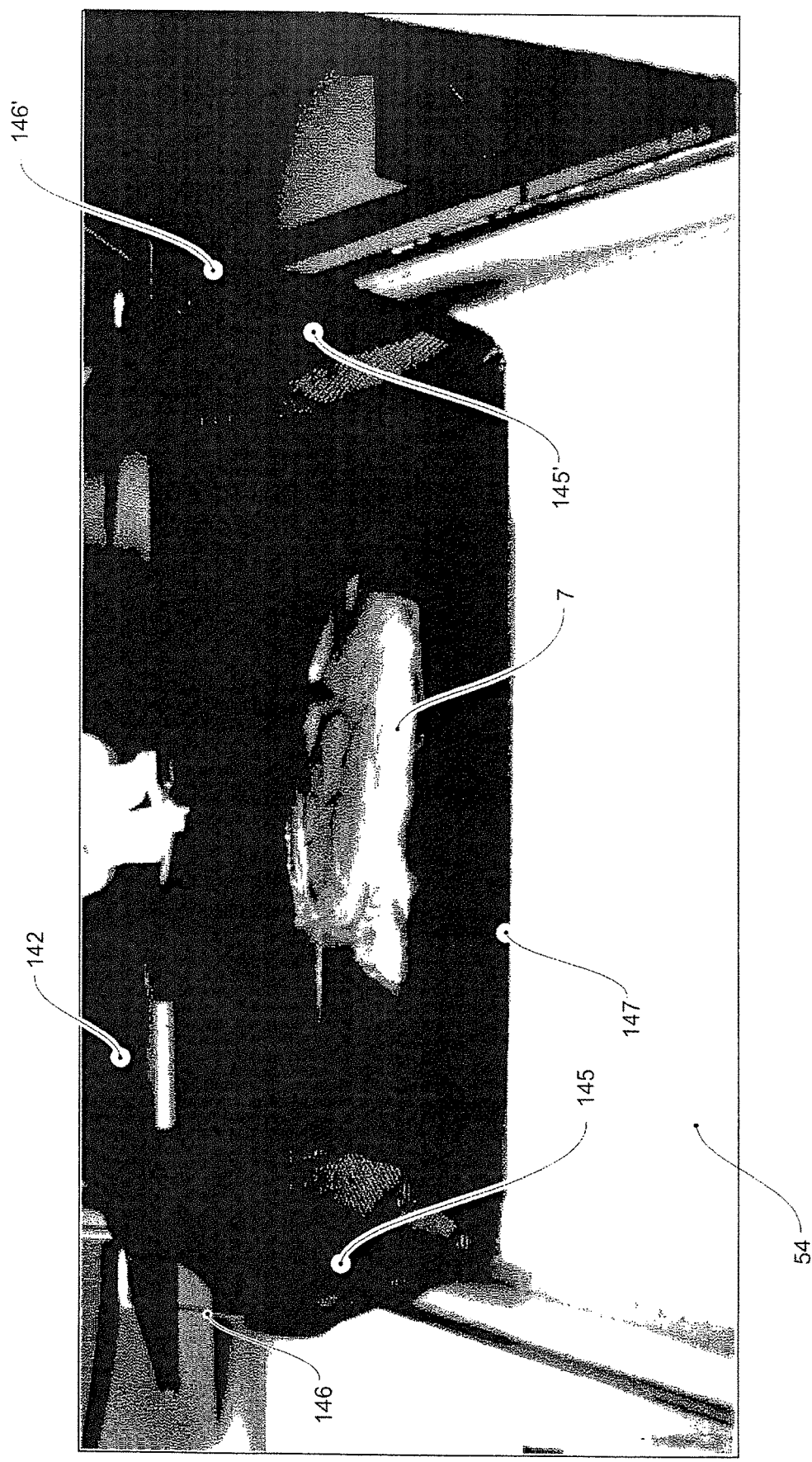
FIG. 6 shows an image of an inspected transport bag that is to be inspected.
Figure 7:
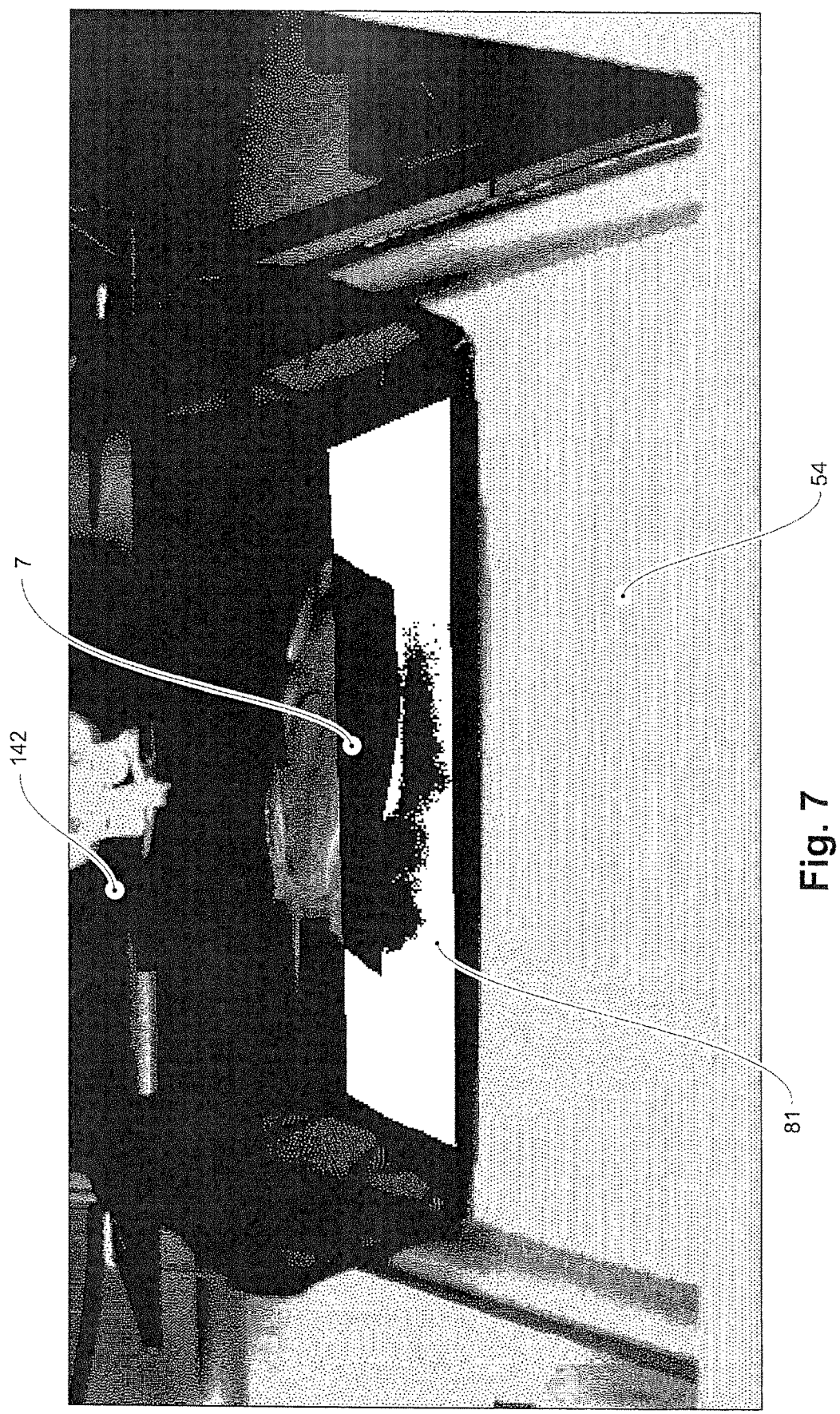
FIG. 7 shows the detection region in the image of FIG. 6.

FIG. 6 shows a real shot of a black-and-white digital camera with a viewing area analogous to FIG. 5. An object 7 in the form of a plastic-wrapped garment has become stuck in the bag interior. After the aforementioned four orientation points have been identified, the inspection area 81 is determined (white square in FIG. 7). The image data are processed, for example by applying a contrast curve and setting a black point, such that the inside of the front wall has the value zero (black) and brighter foreign objects have the value 1 (white). In FIG. 7, the area 81 has been additionally inverted, so that the inside of the front wall appears white, and the object 7 is black. Now the image data in the area 81 can be evaluated in order to be able to make a characterization of the emptying status of the transport bag. In a simple variant, the black and the white image pixels can be counted, for example. If the number of image pixels of the front wall falls below a certain absolute and/or relative value, this is assessed as constituting the detection of a foreign object 7. The transport bag has therefore not been emptied completely.

Figure 8:
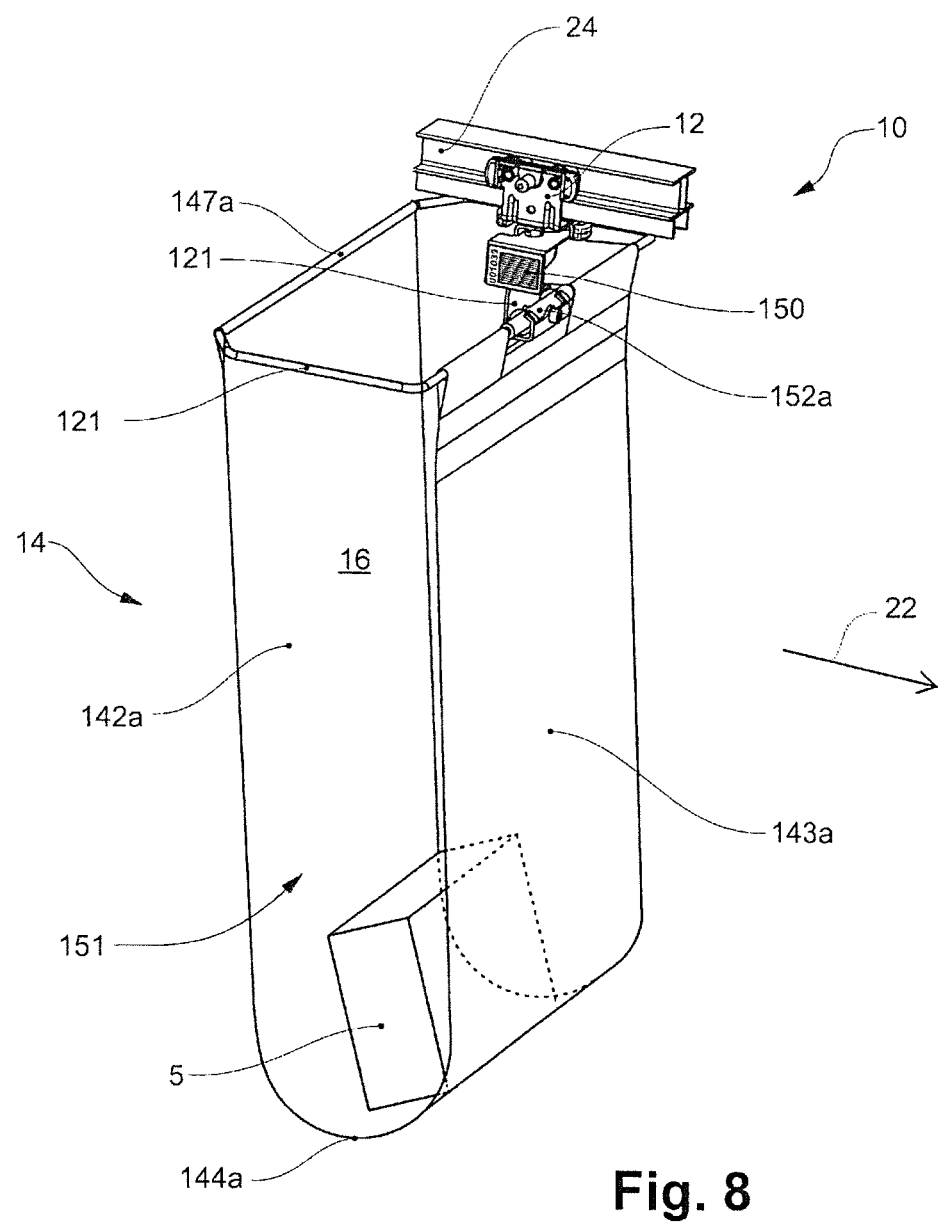
FIG. 8 schematically shows a perspective view of another conveyor unit of a conveyor system, with a transport bag transverse to the conveying direction, filled with a piece good unit, with the conveying direction to the right.
Figure 9:
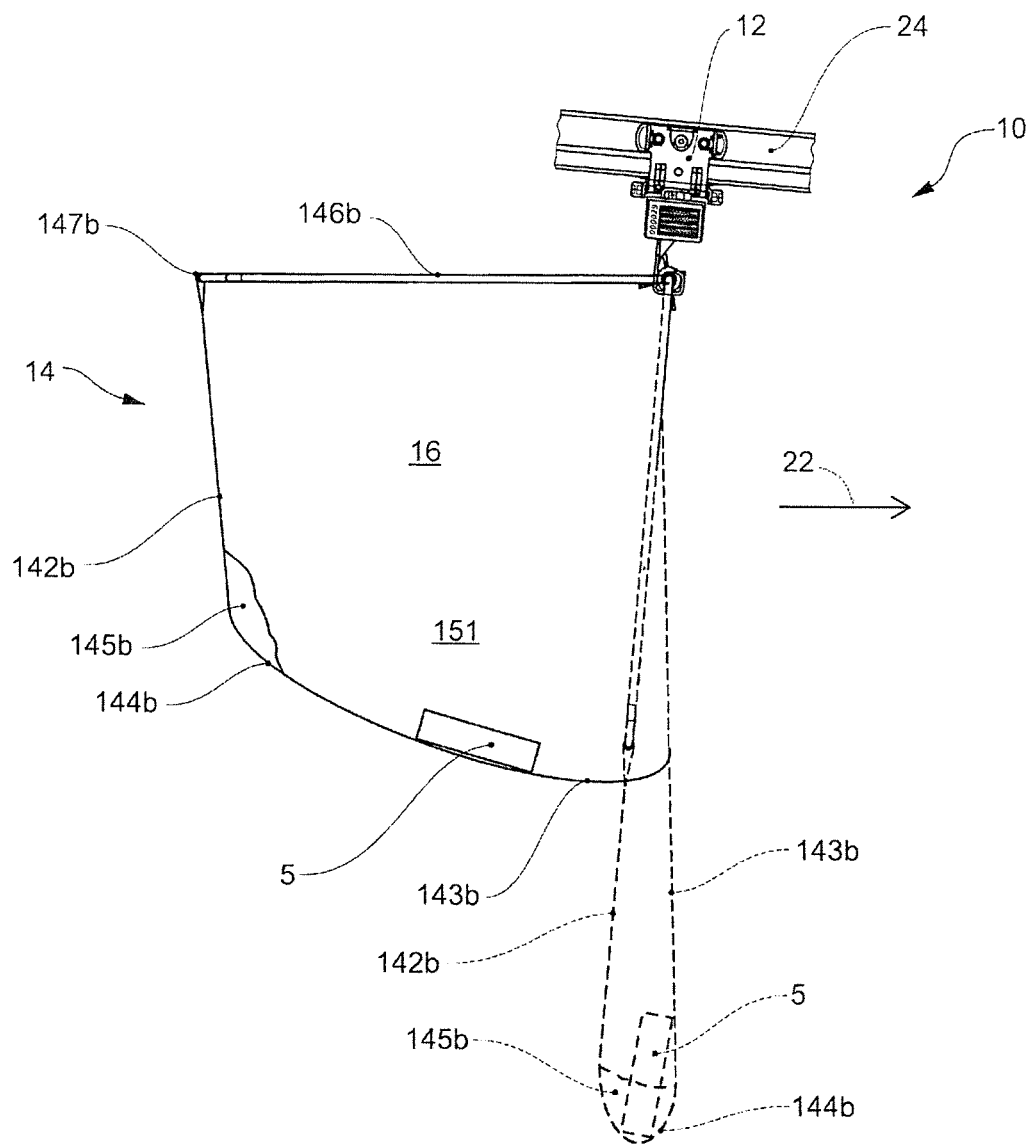
FIG. 9 shows a schematic side view of a further conveyor unit of a conveyor system, with a transport bag transverse to the conveying direction, filled with a piece good unit, with the conveying direction to the right, in a closed transport configuration of the transport bag (dashed lines) and an open loading configuration of the transport bag (solid lines)
Figure 10:
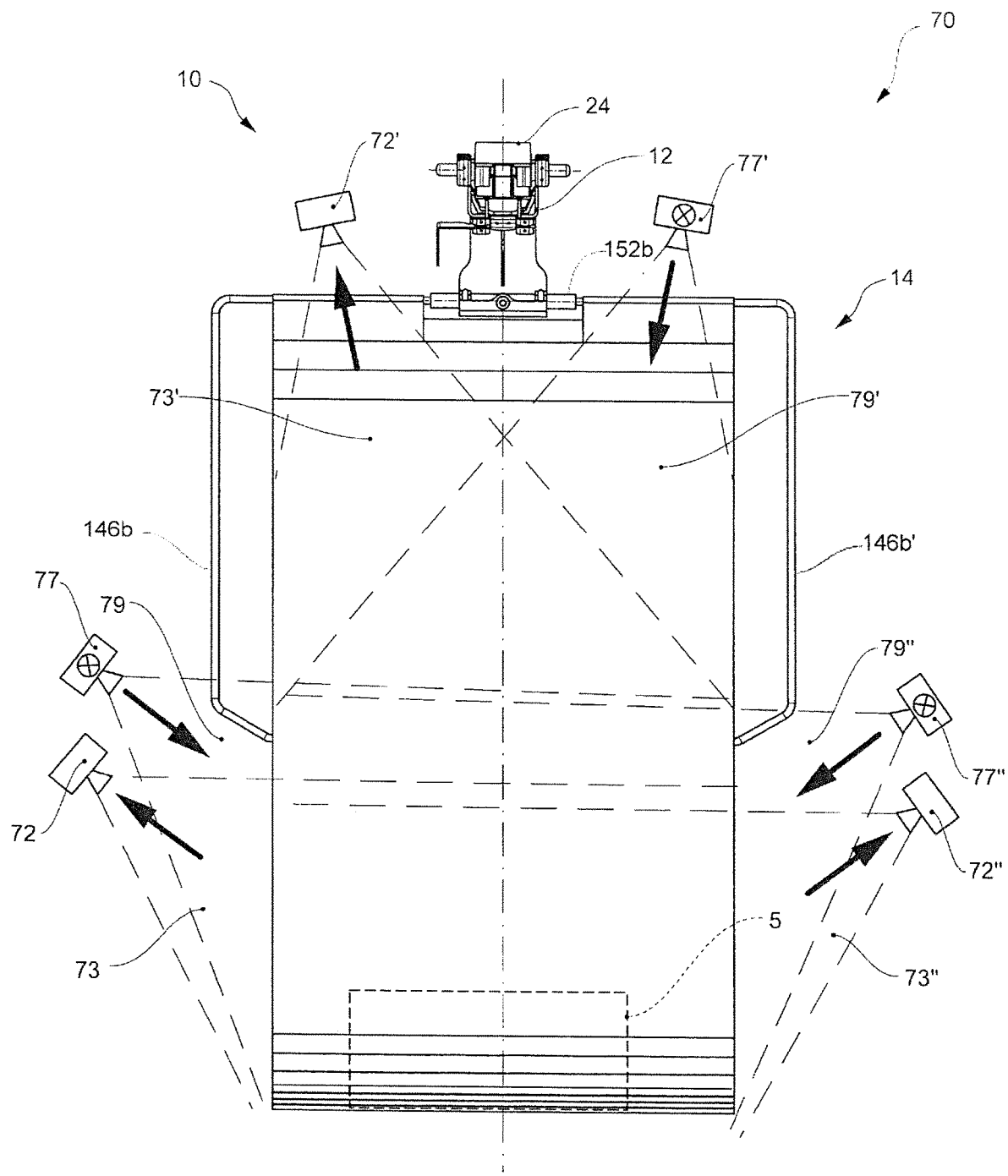
FIG. 10 schematically shows the conveying unit, with a view along the conveying direction of the front wall of the transport bag, with possible arrangements of camera modules and illumination modules.

Instead of through an upper bag opening, as explained in the exemplary embodiment discussed above, a suitably arranged camera module can also capture an image of the inspection area through a lateral bag opening if such an opening is present in a certain type of transport bag (cf. FIGS. 8-10). The image can also be taken through a transparent lateral wall.

Similarly, it is possible to illuminate the inside of the bag by means of lighting modules arranged laterally to the transport bag, which illuminate the inspection area inside the transport bag through a lateral bag opening or a transparent, or at least translucent, lateral wall of the transport bag.

It is also possible to design the inside of a lateral wall to be specular or reflective, so that image capture and/or illumination can take place indirectly via this lateral wall.

An alternative embodiment of a conveyor unit 10 of a conveyor system is shown schematically in FIG. 8. The conveyor unit 10 has a carriage 12 analogous to FIG. 1 and a transport bag 14 pivotably mounted thereon. On the running rail 24 of the conveyor system, the carriage is laterally guided in a form-fitting manner, and is mounted such that it can roll along the conveying direction 22 parallel the running rail 24. A support hook 121 with two hook elements is arranged below the carriage. As in the exemplary embodiment shown, advantageously an identification element 150 is connected to the carriage 12, which allows the transport unit 10 to be identified. The identification element can contain, for example, optically readable information, for example a barcode or a 2D matrix code, or an RFID or another wirelessly readable electronic storage device.

A sleeve 152a of the transport bag is mounted on the hook elements of the support hook. The sleeve 152a corresponds functionally both to the suspension hook of the transport bag from FIG. 1, which is pivotably connected to the carrier section, and to the hinge there, between the carrier section and the bracket of the transport bag. Two ends of a bracket of the transport bag, which can be made of stable metal wire, for example, are pivotably arranged in the sleeve, so that a substantially rectangular, closed bracket is created, which is mounted on the suspension hook 148a, pivotably about the longitudinal axis of the sleeve 152a.

On the transverse side of the bracket with the sleeve 152a and on the opposite transverse side 147a of the bracket, a flexible wall in the form of a fabric web is pivotably connected to the bracket by means of tabs, so that bracket and flexible wall together form a transport bag of the conveyor unit.

Advantageously, the sleeve of the transport bag can be reversibly attached to the support hook. so that the transport bag can be easily separated from the carriage or can be reconnected to it, for example for repairs. For example, the sleeve can be held by the hook elements of the support hook in a clamping manner, subject to spring force.

The two long sides of the bracket act as spacer elements 146a, which keep a fixed distance between the upper edge of the front wall 143a of the transport bag and the upper edge 147a of the rear wall 142a.

To open the transport bag 10 for a loading operation or an unloading operation (loading configuration), during conveying the transport unit 10 along the conveying direction 22, the bracket of the transport bag dragged by the carriage is pivoted upwards in a suitable sliding block guide (not shown) of the transport system. For example, the parts 146a of the bracket projecting over the wall of the transport bag can be used for the sliding block guide.

In the open loading configuration of the transport bag, as shown in FIG. 8, the bracket lies essentially horizontally, so that due to the spacer elements 146a of the bracket the front wall 143a and rear wall 142a of the flexible wall of the transport bag, essentially hanging vertically, are maximally spaced apart. At a lower end of the transport bag opposite the bracket, the front wall and rear wall are connected by a bottom section 144a of the bag wall.

In this loading configuration, the transport bag comprises lateral bag openings 151 transverse to the conveying direction, through which the transport unit can be loaded and unloaded, by inserting a piece good unit 5 into the bag interior 16 of the transport bag, or by retrieving a piece good unit 5 stored in the transport bag from the bag interior 16 of the transport bag.

The lateral bag opening 151 in the loading configuration allows space-saving loading of the transport bag. Since an upper bag opening, as being present in the shown embodiment and being defined by the bracket, is not required for loading or unloading, the transport bag can remain in a transverse orientation that is space-saving in the conveying direction, even if it is not accessible for a loading operation because of the running rail.

In an alternative advantageous embodiment of such a transport unit, one of the two lateral openings can also be closed by a lateral wall. Among other things, this has the advantage that when a piece good unit is thrown into the transport bag, the corresponding object cannot fall out on the opposite side.

It can also be advantageous that in the area of the bottom section 144*a* of the bag wall a lateral wall is arranged on one or both sides, which closes a lower region of the lateral bag opening, so that goods located in the bag are laterally secured in a form-fitting manner.

Another advantageous embodiment of a conveyor unit 14 of a conveyor system with a carriage 12 and a hanging transport bag 14 pivotably attached to it is shown in FIG. 9 in a schematical side view, both in a closed transport configuration of the transport bag (dashed lines) and in an opened loading configuration of the transport bag (solid lines). The conveying direction 22 goes to the right.

The carriage 12 and the support hook of the transport unit 10 are designed in the same way as in the exemplary embodiment in FIG. 8. The spacers 146*b*, 146*b*' of the bracket are longer compared to FIG. 8, so that a larger side opening 151 results in the opened loading configuration of the transport bag 14. The actuation of the bracket, that is to say its raising and lowering, can in turn take place via sliding block guides, through which the bracket is dragged by the carriage during conveyance along the conveying direction 22.

In the loading configuration, a piece good unit 5 that is present in the transport unit 10 or is newly deposited lies on an inside of a lower region of the front wall 143*b* of the transport bag 14. A lateral wall 145*b* is located in the area of the bottom section 144*b* of the bag wall, which connects the front wall 143*b* and the rear wall 14.

When the bracket is pivoted down during the transition from the open loading configuration to the closed transport configuration of the transport bag, the bottom section 144*b* and the lower area of the front wall 143*b* are lowered with respect to the carriage. The piece good unit 5 slides on the front wall 143*b*, driven by gravity, in the direction of the bottom section 144*b*, following the minimum of the potential energy, until it finally lies on the bottom section 144*b* in the transport configuration of the transport bag 19 (shown in dashed lines). In this transport configuration, the lateral walls 145*b* are functional and close off the lower end of the transport bag laterally, so that the piece good unit is held in the transport bag horizontally in all directions in a form-fitting manner.

Conversely, if the bracket of the transport bag is pivoted up during the transition from the closed transport configuration of the transport bag to the open loading configuration, the bottom section 144*b* and the lower area of the front wall 143*b* are raised with respect to the carriage. The piece good unit 5 slides away from the bottom section 144*b* driven by gravity, following the minimum of the potential energy on the lower section of the front wall 143*b*. The inside of the lower section 143*b* of the front wall thus temporarily becomes the functional floor of the transport bag. The piece good unit 5 can now be removed from the transport bag. It is not necessary to raise the piece good unit, since the lateral wall 144*b* is not functional in the loading configuration of the transport bag.

In addition to the advantages mentioned, the embodiments of transport bags shown in FIGS. 8 and 9 offer additional possibilities with regard to devices according to the invention for inspecting transport bags that can be conveyed in a hanging manner. FIG. 10 schematically shows the conveyor unit from FIG. 9 in an embodiment of an inspection device 70 according to the invention, with a view along the conveying direction onto the front wall of the transport bag. Different possible arrangements of camera modules 72 and lighting modules 77 of the detection device 70 are shown. However, these possible arrangements of the various elements of the detection device and the following explanations can also be applied analogously for the transport bag from FIG. 8 or generally for transport bags with one or two lateral bag openings.

The lateral openings of the bag allow to observe and/or to illuminate the inspection area on the inside of the bag wall through these openings. For example, a lighting module 77" can be arranged to the side of the transport bag 14, with a lighting area 79" that covers the inspection area. A camera module 72 is arranged on the opposite side of the transport bag 14, with a viewing area 73 that covers the inspection area. The image evaluation can be carried out analogously to the inspection devices already discussed.

It is also possible to provide a lighting module 77' and a camera module 72' above the transport bag 14 next to the running rail 24, in order to illuminate or observe, respectively, the inspection area inside the transport bag through a bag opening located at the top, namely through the opening of the bracket. This way, the side area remains free, for example for a loading device or unloading device.

Other combinations of the positions of the camera module and the lighting module are also conceivable.

Several camera modules and/or several lighting modules can also be used. The evaluation of the data from the various camera modules can be carried out separately, whereby the results are combined. For example, it can be provided, that the camera modules 72, 72', 72" capture an image, based on which it is determined in each case whether the transport bag is empty or not. If the bag is classified as not empty based on the evaluation of even one image, the other results are overridden. However, the images can also be evaluated together. In any case, the result is a lower false negative rate.

Instead of single images, continuous series of images can also be recorded, from which individual or multiple images are used for the evaluation.

As in the exemplary embodiment of the inspection device in FIG. 2, the inside of the bag can be inspected when the bag is stationary or during conveyance. The capture of the image information can be triggered by sensors, for example by a light barrier that detects a transport bag.

The present invention is not limited in its scope to the specific embodiments described herein. Rather, in addition to the examples disclosed herein, a person skilled in the art will derive various other modifications of the present agreement from the description and the associated figures that also fall within the scope of protection of the claims. In addition, various references are cited in the description whose disclosure is hereby incorporated in its totality into the description by reference.

The invention claimed is:

1. A device for inspecting transport bags that can be conveyed in a suspended manner, with a bag interior for receiving piece-goods units, wherein the transport bag has a bag opening of the bag interior, the device comprising:
   a detection device that is configured to capture at least one two-dimensional and/or three-dimensional image of at least part of the bag interior of the transport bag to be inspected,
   wherein the detection device comprises an evaluation module that is configured to analyze the captured or calculated image data of an inspected transport bag and to provide data based on this image data analysis that contain information regarding whether the inspected transport bag is empty or contains an object.

2. The inspection device according to claim 1, wherein the inspection device comprises a device for opening and/or keeping open the bag opening of a transport bag that is to be inspected.

3. The inspection device according to claim 2,
   wherein the detection device comprises a device for opening and/or keeping open the bag opening of a transport bag that is to be inspected;
   wherein the device for opening and/or keeping open the bag opening of a transport bag to be inspected comprises a lifting device that is configured to move an inspection bag to be inspected from a conveying position in which the transport bag hangs vertically into an inspection position in which the transport bag is disposed on an inclined plane such that a front wall of the transport bag or an edge of said front wall rests on the inclined plane and the end of the front wall facing toward the bag opening of the transport bag is lower in the direction of gravity than the end of the front wall opposite the bag opening, so that the inner surface of the front wall forms another inclined plane; and
   wherein the detection device is configured to capture at least one two-dimensional and/or three-dimensional image of at least part of the bag interior of a transport bag that is disposed in the inspection position.

4. The inspection device according to claim 3, wherein the lifting device comprises at least one of a lifting table, a ramp, a circulating conveyor belt, a roller arrangement, and a roller ramp, which forms an inclined plane.

5. The inspection device according to claim 2,
   wherein the detection device comprises a device for opening and/or keeping open the bag opening of a transport bag that is to be inspected;
   wherein the device for opening and/or keeping open the bag opening of a transport bag to be inspected comprises a device for emptying transport bags that are conveyed in a suspended manner,
   with a conveyor system, particularly a rail-guided conveyor system or a conveyor chain system, with which transport bags can be fed in a suspended manner along a conveyor path; and
   with a circulating conveyor belt for picking up piece-goods units that are transported in the transport bags,
   wherein, in a contact section, the conveyance path of the conveyor system and the conveyance path of the conveyor belt are arranged such that the distance between the conveyance path of the conveyor system and the conveyance path of the conveyor belt becomes continuously smaller, so that when a transport bag is conveyed along the contact section, a front wall of the transport bag contacts the conveyor belt and comes to rest on same, the transport bag being pivoted backward;
   wherein, in a delivery section, the conveyance path of the conveyor system and the conveyance path of the conveyor belt extend substantially parallel to one another with a certain downward slope, and during conveyance of the transport bag along the delivery section, the front wall of the transport bag continues to lie on the conveyor belt, so that the bag opening of the transport bag is oriented inclined downward and piece-goods units that are present in the bag interior of the transport bag slide out of the bag interior and onto the conveyor belt by force of gravity;
   wherein, in a separating section, the distance between the conveyance path of the conveyor system and the conveyance path of the conveyor belt increases continuously, so that when the transport bag is conveyed along the separating section, the emptied transport bag is lifted off the conveyor belt and swivels back into the freely suspended position; and
   wherein the detection device of the inspection device is configured such that it can capture the at least one two-dimensional or three-dimensional image of at least part of the bag interior of the transport bag to be inspected when the transport bag to be inspected is located in the delivery section or in the separating section in a defined detection position at which the emptying of the transport bag to be inspected is concluded during functional operation of the device for emptying transport bags that are conveyed in a suspended manner.

6. The inspection device according to claim 5, with a guide ramp arranged in a separating section that guides transport bags that are lifted off the conveyor belt such that a collision of the transport bags with parts of the detection device, particularly with a camera module of the detection device, is not possible.

7. The inspection device according to claim 2, wherein the device for opening and/or keeping open the bag opening of a transport bag to be inspected comprises an actuator device that is configured to move a stable front wall of the transport bag that is movably connected to a stable rear wall of a transport bag to be inspected relative to said rear wall in the direction of a bag opening of the transport bag.

8. The inspection device according to claim 7, wherein the actuator device is configured to move a lower edge of the front wall of the transport bag facing away from the bag opening of the transport bag relative to the rear wall of the transport bag in the direction of the bag opening.

9. The inspection device according to claim 7 wherein the actuator device comprises at least one of a lifting table, a ramp, a circulating conveyor belt with ribs, a roller assembly and a roller ramp that move the front wall of the transport bag or the lower edge of the front wall relative to the rear wall of the transport bag in the direction of the bag opening.

10. The inspection device according to claim 2, wherein the device for opening and/or keeping open the bag opening of a transport bag to be inspected comprises an actuator device that is set up to move a front wall of the transport bag, movably connected to a rear wall of the transport bag to be inspected, relative to said rear wall of the transport bag, or to move a rear wall of the transport bag, movably connected to a front wall of the transport bag to be inspected, relative to said front wall of the transport bag.

11. The inspection device according to claim 10, wherein the actuator device comprises a sliding block guide that interacts with a bracket of a transport bag to be inspected, arranged between the front wall and the rear wall.

12. The inspection device according to claim 1, wherein the transport bag comprises at least one bag opening of the bag interior that lies in an upper region of the bag interior and/or a lateral region of the bag interior when the transport bag is in a suspended position.

13. The inspection device according to claim 1, wherein the bag opening of the transport bag is implemented as a transparent region in a wall of the transport bag, particularly as a window or window section in a wall of the transport bag.

14. The inspection device according to claim 1, wherein the detection device comprises at least one camera module that is configured to capture at least one image of at least part of the bag interior of the transport bag to be inspected.

15. The inspection device according to claim 1, wherein the detection device comprises at least one laser scanner module that is configured to guide one or more laser beams over at least part of the surface of the bag interior of the transport bag to be inspected.

16. The inspection device according to claim 1, wherein the detection device comprises an illumination module that is configured to illuminate at least part of the bag interior of the transport bag to be inspected with one or more illuminating means.

17. The inspection device according to claim 1, wherein the detection device comprises an imaging module that is configured to calculate a three-dimensional image of at least a part of the bag interior of an inspected transport bag from captured image data of the detection device.

18. The inspection device according to claim 1, wherein the detection device comprises an evaluation module that is configured to analyze the captured or calculated image data of an inspected transport bag and, based on this image data analysis, to read out optically readable information present on an object located in the inspected transport bag.

19. The inspection device according to claim 1, wherein the detection device comprises an evaluation module that is configured to analyze the captured or calculated image data of an inspected transport bag with AI algorithms and, based on this image data analysis, to identify and/or classify an object located in the inspected transport bag.

20. A method for inspecting transport bags that can be conveyed in a suspended manner comprising:
providing a transport bag to be inspected, the transport bag having a bag interior for receiving piece-goods units and a bag opening of the bag interior; and
capturing at least one two-dimensional and/or three-dimensional image of at least part of the bag interior.

21. The method according to claim 20, further comprising opening and/or keeping open the bag opening of a transport bag.

22. The method according to claim 20, further comprising the transport bag having at least one bag opening of the bag interior that lies in an upper region of the bag interior and/or a lateral region of the bag interior when the transport bag is in a suspended position.

23. The method according to claim 20, further comprising the bag opening of the transport bag being implemented as a transparent region in a wall of the transport bag, particularly as a window or window section in the transport bag.

24. The method according to claim 20, further comprising calculating a three-dimensional image of at least part of the bag interior from captured image data of at least part of the bag interior of an inspected transport bag.

25. The method of according to claim 20, further comprising analyzing the captured or calculated image data of an inspected transport bag and, based on this image data analysis, providing data containing information about whether the inspected transport bag is empty or contains an object.

26. The method of according to claim 20, further comprising analyzing the captured or calculated image data of an inspected transport bag and, based on this image data analysis, reading out optically readable information on an object located in the inspected transport bag.

27. The method of according to claim 20, further comprising analyzing the captured or calculated image data of an inspected transport bag with AI algorithms and, based on this image data analysis, identifying and/or classifying an object located in the inspected transport bag.

28. The method of according to claim 20, wherein the captured or calculated image data of an inspected transport bag are used to train AI algorithms, with which after completed training further captured or calculated image data of an inspected transport bag can be analyzed, and, based on this image data analysis, an object located in the inspected transport bag can be identified and/or classified.

29. The method according to claim 20, further comprising
capturing an image that shows at least one inner side of a wall, particularly of a front wall of a transport bag to be inspected lying against the bag interior;
identifying an inspection area on the captured image showing at least a part of the inside of the wall;
analyzing the image data of the identified inspection area as to whether, in addition to the inside of the wall, another object being also shown; and
providing data based on the image data analysis, the data including information about whether the inspected transport bag is empty or contains an object.

30. The method according to claim 29, further comprising
further determining the image coordinates of two outer endpoints of the upper edge of the front wall of the transport bag facing toward the bag opening and the image coordinates of two endpoints of the lower edge of the front wall facing away from the bag opening, to identify the inspection area in the image; and
determining as the inspection area at least a portion of a quadrangle that is defined by the image coordinates of the two outer endpoints of the upper edge and the two endpoints of the lower edge.

31. The method according to claim 29, further comprising comparing brightness of pixels within the inspection area to a threshold value, the inside of the front wall of the transport bag being monochrome; and providing data based on a number of pixels below and above said threshold value, the data including information about whether or not an object is shown within the inspection area.

* * * * *